(12) United States Patent
Hirabayashi

(10) Patent No.: US 12,492,744 B2
(45) Date of Patent: Dec. 9, 2025

(54) ROTATING DEVICE

(71) Applicant: MINEBEA MITSUMI Inc., Nagano (JP)

(72) Inventor: Koichiro Hirabayashi, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 469 days.

(21) Appl. No.: 17/414,659

(22) PCT Filed: Dec. 10, 2019

(86) PCT No.: PCT/JP2019/048344
§ 371 (c)(1),
(2) Date: Jun. 16, 2021

(87) PCT Pub. No.: WO2020/129758
PCT Pub. Date: Jun. 25, 2020

(65) Prior Publication Data
US 2022/0056993 A1  Feb. 24, 2022

(30) Foreign Application Priority Data
Dec. 17, 2018 (JP) .................... 2018-235596

(51) Int. Cl.
*F16H 57/028* (2012.01)
*F16H 1/16* (2006.01)
(Continued)

(52) U.S. Cl.
CPC ............ *F16H 57/028* (2013.01); *F16H 1/16* (2013.01); *H02K 5/24* (2013.01); *H02K 7/116* (2013.01); *F16H 2057/02034* (2013.01)

(58) Field of Classification Search
CPC ............ H02K 7/116; H02K 5/24; F16H 2057/02034; F16H 57/028; F16H 1/16
See application file for complete search history.

(56) References Cited

U.S. PATENT DOCUMENTS 4,017,267 A * 4/1977 Hawley .................. B21D 28/14
83/637
5,713,118 A * 2/1998 Swann .................. B25B 1/2489
29/560.1
(Continued)

FOREIGN PATENT DOCUMENTS

CN      103780016 A    5/2014
CN      106953461 A    7/2017
(Continued)

OTHER PUBLICATIONS

English translation of the Written Opinion for corresponding International Application No. PCT/JP2019/048344 dated Mar. 3, 2020.
(Continued)

*Primary Examiner* — Christopher M Koehler
*Assistant Examiner* — Ahmed F Seck
(74) *Attorney, Agent, or Firm* — Chrisman Gallo Tochtrop LLC

(57) ABSTRACT

A rotating device according to an embodiment includes a housing including a first housing and a second housing opposing each other; a motor accommodated in the housing; and a gear transmitting a rotation of the motor to the external device. In the first housing, a tubular protrusion part including a first through hole is formed, and in the second housing, a second through hole for fitting the protrusion part is provided.

14 Claims, 18 Drawing Sheets

(51) Int. Cl.
*F16H 57/02* (2012.01)
*H02K 5/24* (2006.01)
*H02K 7/116* (2006.01)

(56) References Cited

U.S. PATENT DOCUMENTS

| | | | | |
|---|---|---|---|---|
| 6,415,686 | B1* | 7/2002 | Milano, Jr. | F16H 57/033 |
| | | | | 74/606 R |
| 8,727,096 | B2* | 5/2014 | Schroader | B65G 47/844 |
| | | | | 198/370.01 |
| 9,024,627 | B2 | 5/2015 | Inoue et al. | |
| 10,100,916 | B2 | 10/2018 | Inoue et al. | |
| 10,502,282 | B2* | 12/2019 | Fujii | F16H 1/08 |
| 2011/0239798 | A1* | 10/2011 | Ramirez, Jr. | H02K 5/10 |
| | | | | 74/412 R |
| 2014/0000399 | A1 | 1/2014 | Inoue et al. | |
| 2015/0204433 | A1 | 7/2015 | Inoue et al. | |
| 2017/0361681 | A1 | 12/2017 | Matsumura | |
| 2018/0034345 | A1* | 2/2018 | Hirabayashi | F16H 1/203 |
| 2018/0347681 | A1* | 12/2018 | Masuzawa | F16H 57/023 |
| 2020/0123817 | A1* | 4/2020 | Inose | E05B 85/24 |

FOREIGN PATENT DOCUMENTS

| | | |
|---|---|---|
| JP | 07-014567 U | 3/1995 |
| JP | 2009-247103 A | 10/2009 |
| JP | 2013-005512 A | 1/2013 |
| JP | 2017-158304 A | 9/2017 |

OTHER PUBLICATIONS

International Search Report for corresponding International Application No. PCT/JP2019/048344 mailed Mar. 3, 2020.
Written Opinion for corresponding International Application No. PCT/JP2019/048344 dated Mar. 3, 2020.
Decision to Grant a Patent dated Mar. 7, 2023 for corresponding Japanese Application No. JP2018-235596 and English translation.
Notice of Reasons for Refusal dated Aug. 30, 2022 for corresponding Japanese Application No. JP2018-235596 and English translation.
First Office Action for corresponding Chinese Application No. 201980083404.2 dated Jun. 26, 2024 and English translation.

* cited by examiner

ROTATING DEVICE

FIELD

The present invention relates to a rotating device.

BACKGROUND

Conventionally, there has been known a rotating device (motor actuator) comprising a motor and a group of gears for transmitting the rotation of the rotating shaft of the motor accommodated in a housing comprising a first housing and a second housing facing each other (see Patent Literature 1). In general, the first housing and the second housing are molded of resin.

CITATION LIST

Patent Literature

Patent Literature 1: Japanese Patent Application Laid-open No. 2013-5512

SUMMARY

Technical Problem

However, in the rotating device disclosed in Patent Literature 1 described above, when the first housing and the second housing are molded, warpage may occur due to shrinkage. If there is warpage in at least one of the first housing and the second housing forming the housing, the position of the gears held by the housing or the inclination of the gears may not be stable, and when the motor rotates, the housing may vibrate and generate abnormal noise.

The present invention takes the above problem as an example, and an object of the present invention is to provide a rotating device capable of correcting the warpage that occurs during molding, even if the warpage occurs in the first housing or the second housing during molding, when a housing is formed by assembling the first housing and the second housing.

Solution to Problem

In order to achieve the above object, the present invention is grasped by the following constitution. A rotating device according to the present invention comprises a housing including a first housing and a second housing opposing each other, and a motor accommodated in the housing, and a gear transmitting a rotation of the motor to outside. In the first housing, a tubular protrusion part including a first through hole is formed. In the second housing, a second through hole for fitting the protrusion part is provided.

DESCRIPTION OF EMBODIMENTS

Figure 1:
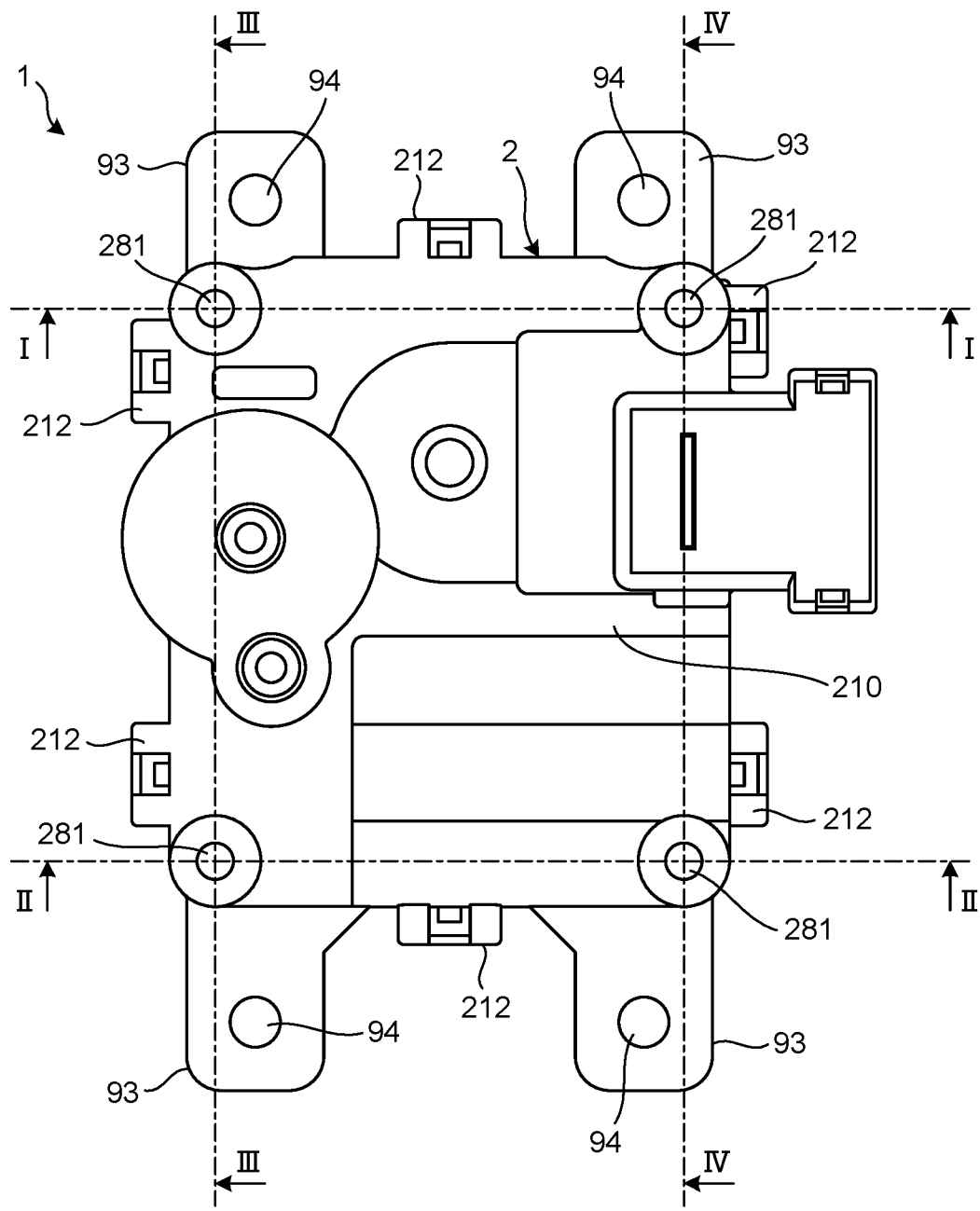
FIG. 1 is a plan view of a rotating device according to an embodiment.

Hereinafter, a mode for carrying out the present invention (hereinafter, referred to as an "embodiment") will be described in detail with reference to the accompanying drawings. The same reference numerals denote the same components throughout the entire description of the embodiment.

Figure 2:
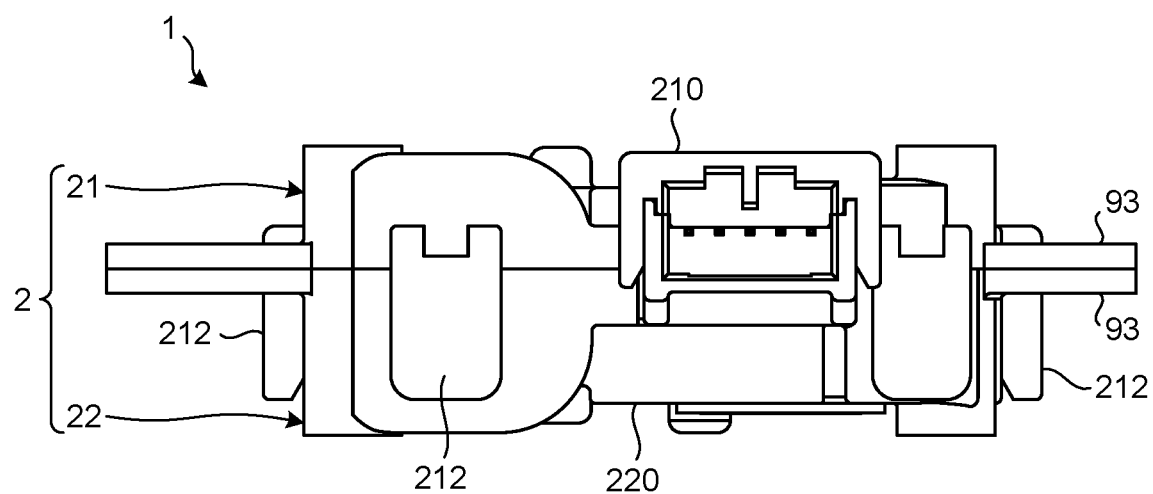
FIG. 2 is a side view of the rotating device according to the embodiment.
Figure 3:
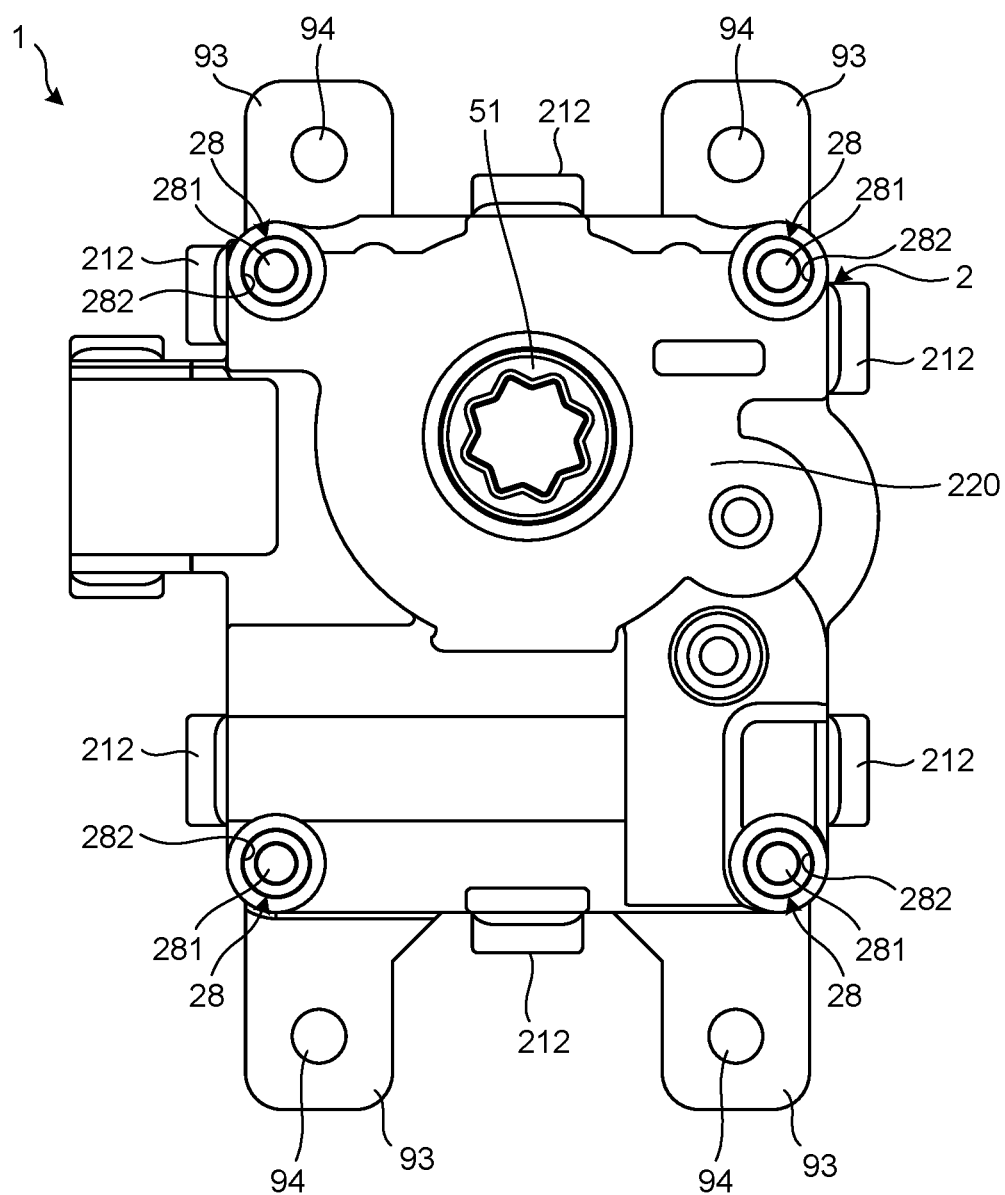
FIG. 3 is a bottom view of the rotating device according to the embodiment.
Figure 4A:
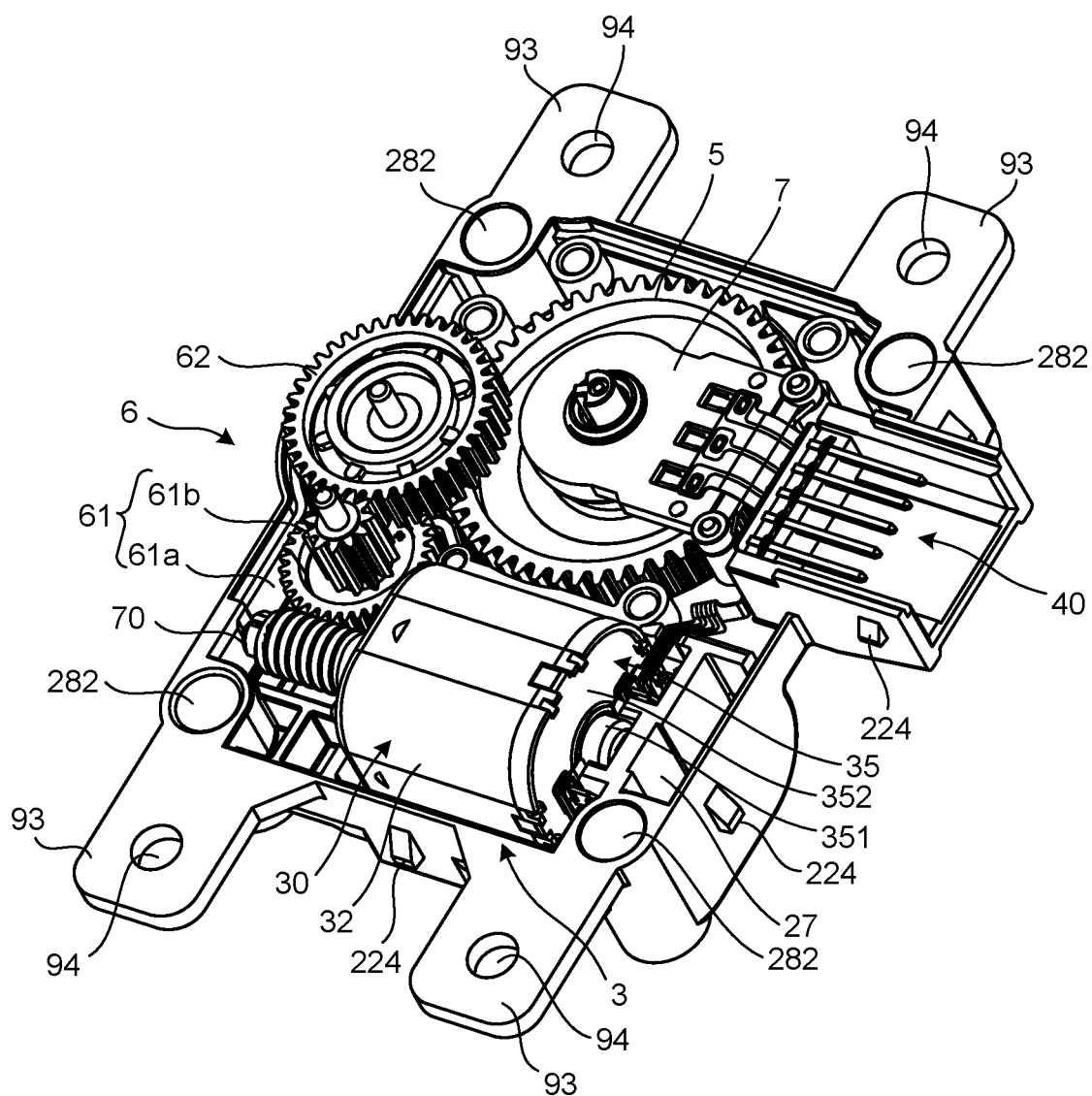
FIG. 4A is a perspective view of a first housing removed from the rotating device according to the embodiment.
Figure 4B:
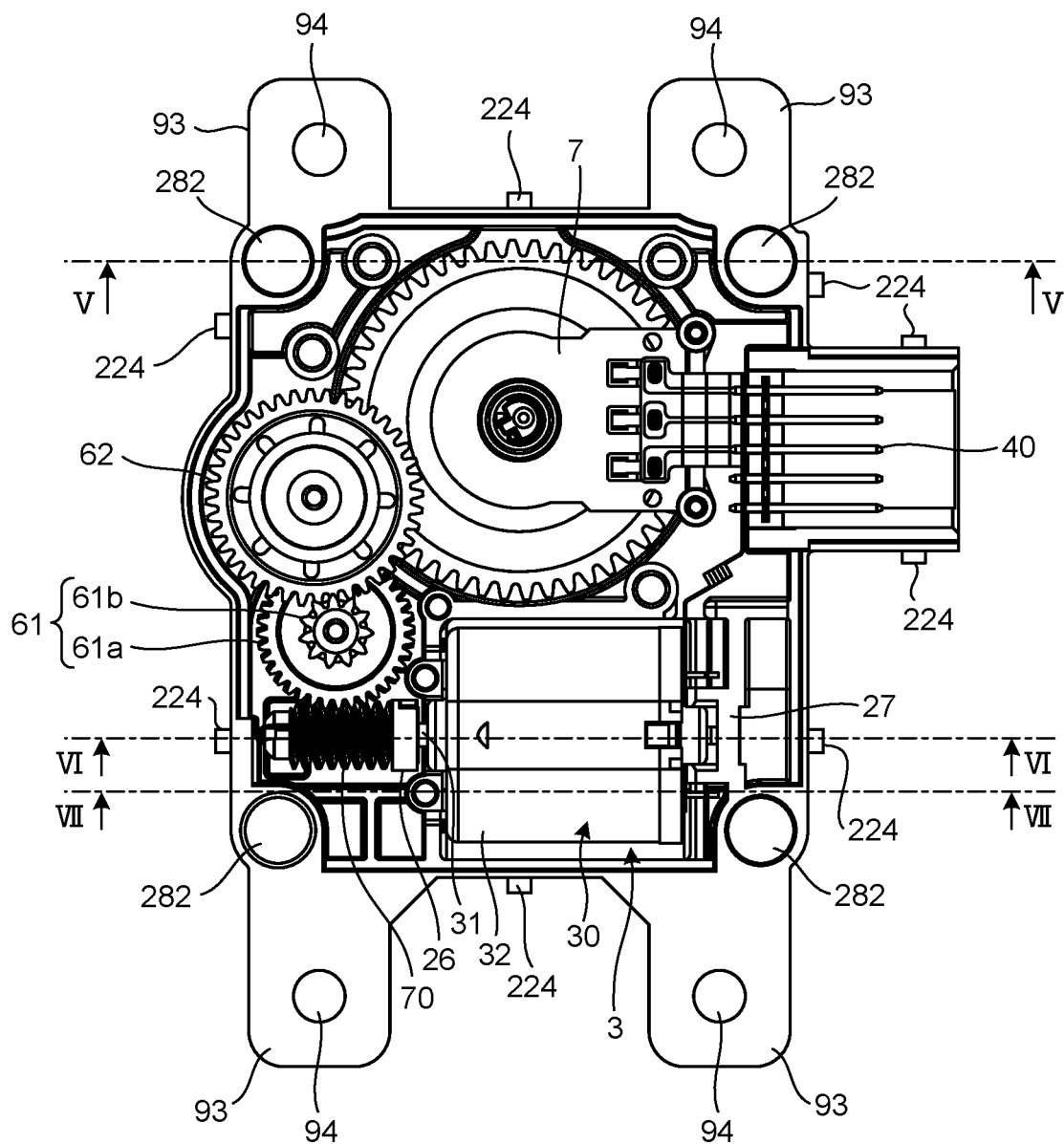
FIG. 4B is a plan view of the first housing removed from the rotating device according to the embodiment.
Figure 4C:
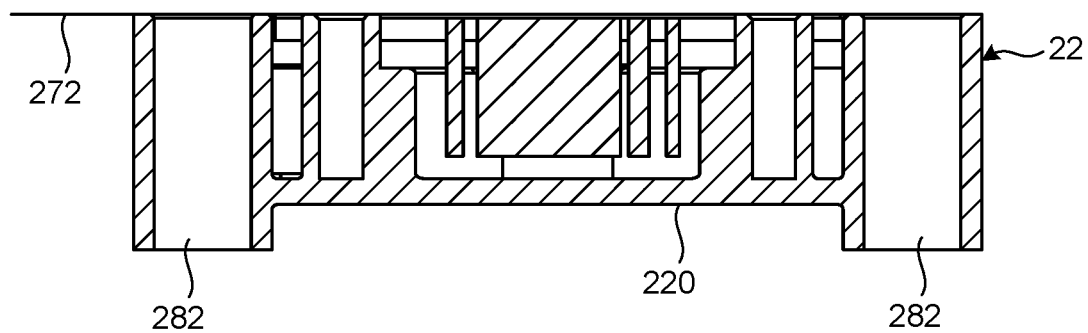
FIG. 4C is a sectional view cut along the line V-V in FIG. 4B.
Figure 4D:
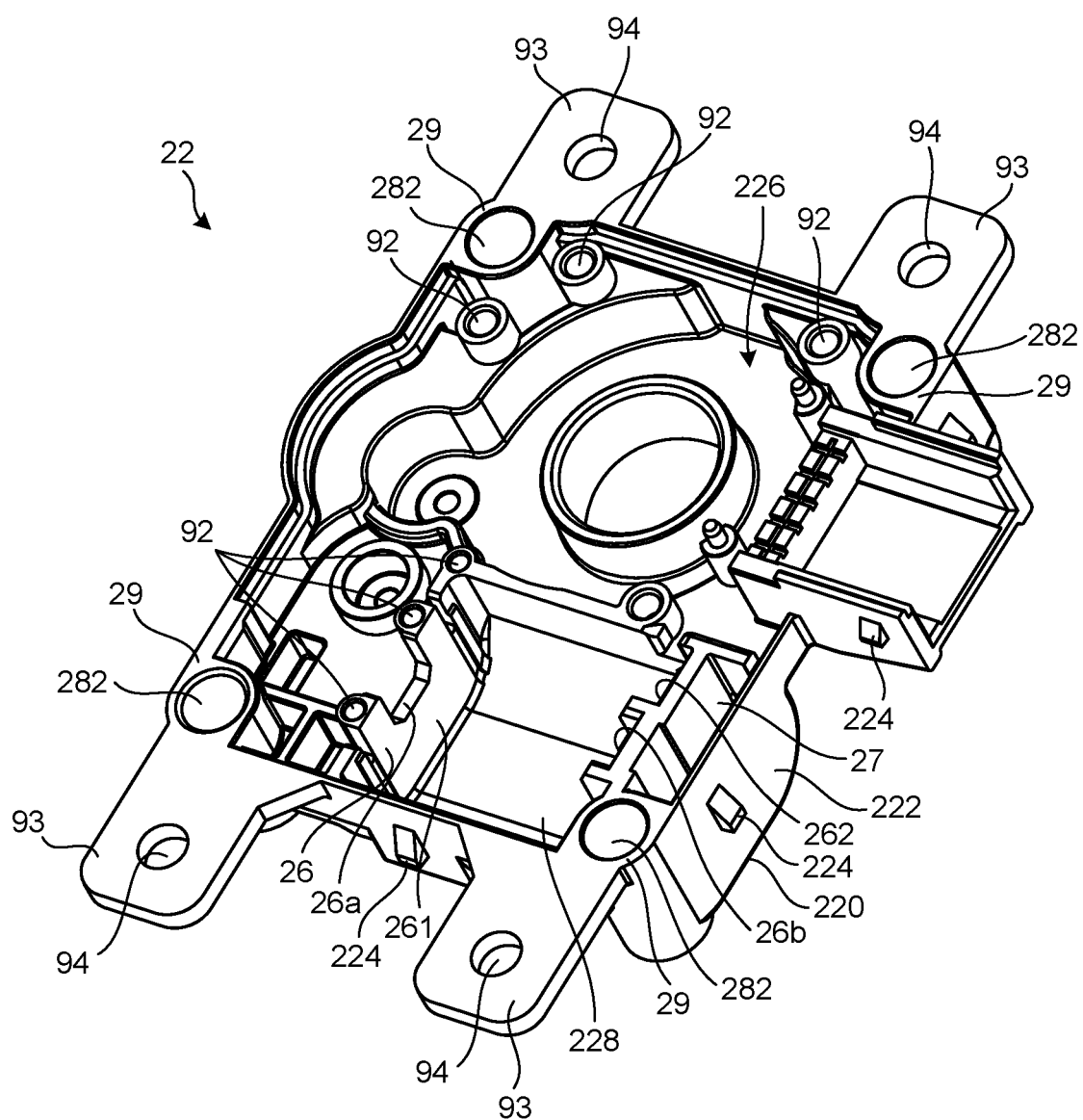
FIG. 4D is a perspective view of a second housing of the rotating device according to the embodiment.
Figure 5:
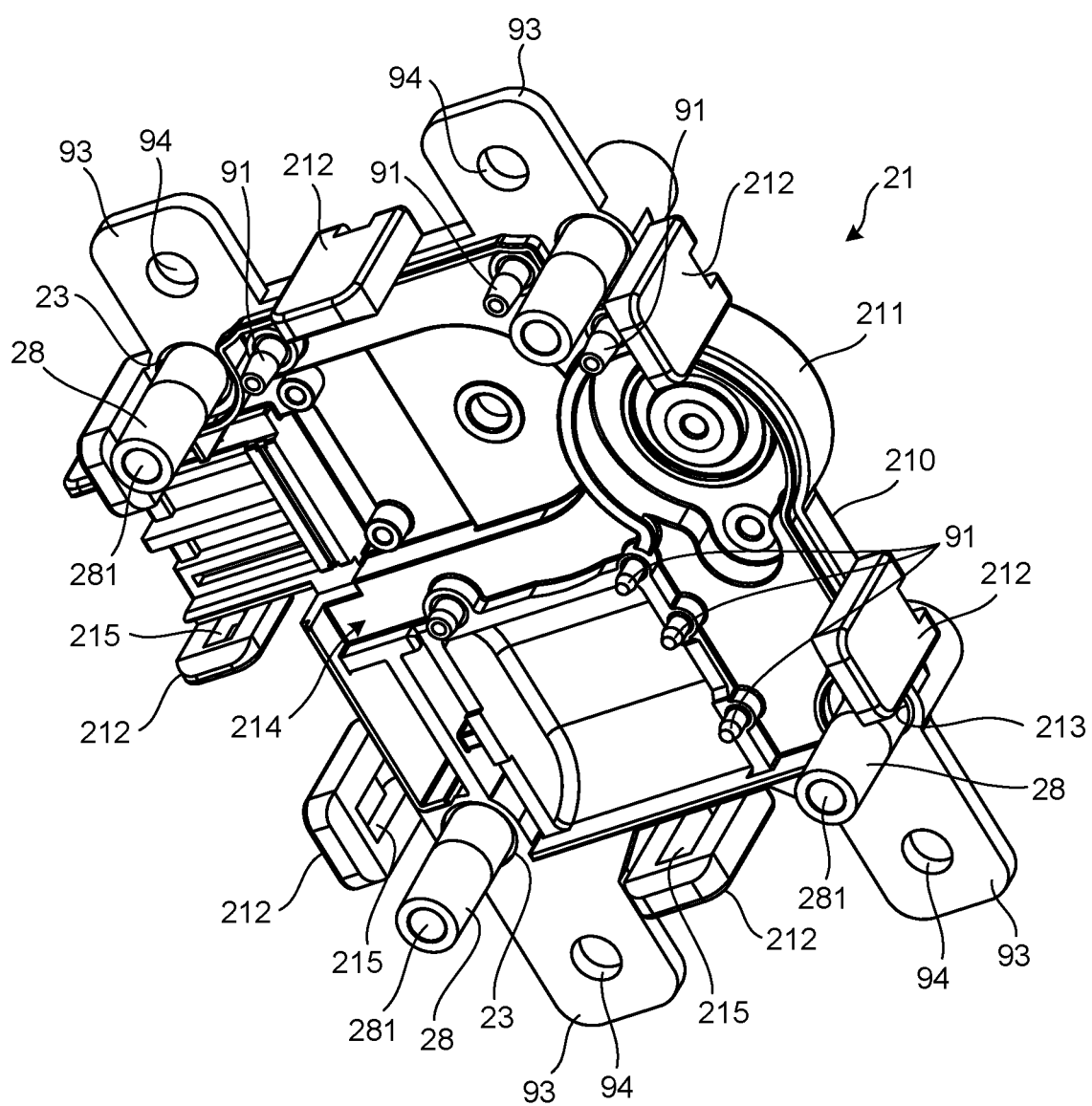
FIG. 5 is a perspective view of the first housing of the rotating device according to the embodiment.

FIG. 1 is a plan view of a rotating device according to an embodiment. FIG. 2 is a side view of the rotating device according to the embodiment. FIG. 3 is a bottom view of the rotating device according to the embodiment. FIG. 4A is a perspective view of a first housing removed from the rotating device according to the embodiment. FIG. 4B is a plan view of the first housing removed from the rotating device according to the embodiment. FIG. 4C is a sectional view cut along the line V-V in FIG. 4B. FIG. 4D is a perspective view of a second housing of the rotating device according to the embodiment. Moreover, FIG. 5 is a perspective view of the first housing of the rotating device according to the embodiment.

For example, a rotating device 1 according to the embodiment can be suitably used as an actuator used in air conditioning systems for vehicles, and can control the rotational movement of louvers for controlling the air volume and the like.

As illustrated in FIG. 1 to FIG. 3, the rotating device 1 includes a housing 2 accommodating a power transmission mechanism unit. Specifically, in this example, the power transmission mechanism unit is configured by a motor 3 illustrated in FIG. 4A and FIG. 4B, a plurality of gears (hereinafter, referred to as a gear group) 6 for transmitting power from the motor 3, a sensor 7 for detecting the rotation angle of an output gear 5 included in the gear group 6, and the like. The sensor 7 may also detect the rotation frequency of the output gear 5 instead of the rotation angle, or may detect both the rotation angle and the rotation frequency.

The gear group 6 of the power transmission mechanism unit includes a worm gear 70 installed on a rotating shaft 31 (see FIG. 12) of the motor 3, a first transmission gear 61, a second transmission gear 62, and the output gear 5. That is, as illustrated in FIG. 4A, the rotation of the worm gear 70 is transmitted to a helical gear 61a of the first transmission gear 61, and is transmitted to the second transmission gear 62 via a small-diameter gear 61b provided at the same shaft as the helical gear 61a, and having a relatively smaller diameter than the helical gear 61a. The rotation of the second transmission gear 62 is transmitted to the output gear 5. Moreover, an output shaft 51 (FIG. 3) is coupled to the output gear 5.

Consequently, the rotation of the motor 3 is reduced at a predetermined reduction ratio, and can be output to the external device through the output shaft 51. The rotation angle of the output gear 5 is then detected by the sensor 7. Information on the rotation angle of the output gear 5 detected by the sensor 7 is transmitted to the external device via a terminal group 40 illustrated in FIG. 4A and FIG. 4B.

In the present embodiment, a DC motor is used as the motor 3. However, a brushless motor and a stepping motor may also be used. When the brushless motor or the stepping motor is used, the rotating device 1 may not require the sensor 7.

As illustrated in FIG. 2, the housing 2 includes a first housing 21 and a second housing 22 opposing each other. That is, the housing 2 is formed by connecting the first housing 21 (FIG. 5) having an opening part 214 and the second housing 22 (FIG. 4D) having an opening part 226, in a state while the opening parts 214 and 226 are abutted to each other.

As illustrated in FIG. 5, the first housing 21 includes a first surface part 210 to be a top surface part of the housing 2, and a first side wall part 211 provided at the outer peripheral part of the first surface part 210. The opening part 214 is surrounded by the first side wall part 211. Alternatively, as illustrated in FIG. 3 and FIG. 4D, the second housing 22 includes a second surface part 220 to be a bottom surface part of the housing 2, and a second side wall part 222 provided at the outer peripheral part of the second surface part 220. The opening part 226 is surrounded by the second side wall part 222. The housing 2 is formed of a resin material such as polypropylene, polyethylene terephthalate, and acrylonitrile butadiene styrene (ABS).

Moreover, as illustrated in FIG. 5 and FIG. 4D, a first contact surface 271 and a second contact surface 272 coming into contact with each other, are formed at the corresponding peripheral part of the opening part 214 of the first housing 21 and the peripheral part of the opening part 226 of the second housing 22 (see FIG. 6 to FIG. 9).

Furthermore, as illustrated in FIG. 5, in the first housing 21, a plurality of engagement parts 212 extending toward the second housing 22 side are integrally formed at the outer peripheral part of the first side wall part 211. An engagement recessed part 215 is provided at each of the engagement parts 212. On the other hand, as illustrated in FIG. 4D, in the second housing 22, a plurality of projections (hereinafter, referred to as engagement projections) 224 corresponding to the engagement parts 212 of the first housing 21 are integrally formed at the second side wall part 222. Each of the engagement projections 224 engages with the engagement recessed part 215 in the engagement part 212.

Consequently, the housing 2 is formed by abutting the first housing 21 and the second housing 22 so that the first contact surface 271 and the second contact surface 272 come into contact with each other (see FIG. 2). That is, by engaging the engagement projection 224 of the second housing 22 with a hole part of the engagement part 212 of the first housing 21, the first housing 21 and the second housing 22 are integrated, and the housing 2 for accommodating the power transmission mechanism unit including the motor 3, the gear group 6, and the like described above is formed.

In the present embodiment, the engagement part 212 is provided in the first housing 21, and the engagement projection 224 is provided in the second housing 22. However, the engagement part 212 may be provided in the second housing 22, and the engagement projection 224 may be provided in the first housing 21.

As illustrated in FIG. 5, a plurality of projection parts 91 are provided in the first housing 21 for positioning. As illustrated in FIG. 4D, a plurality of fitting holes 92 each corresponding to each of the projection parts 91 in the first housing 21 are provided in the second housing 22. In a state when the first housing 21 and the second housing 22 are abutted to each other and integrally joined, the projection part 91 is fitted into each hole part (hereinafter, referred to as a fitting hole) 92.

Moreover, as illustrated in FIG. 5 and FIG. 4D, a piece (hereinafter, referred to as a joining piece) 93 protruding outward is formed at both end parts of one side of the first housing 21 and the second housing 22. A connection hole 94 for inserting a tightening tool (not illustrated) serving as a predetermined fixing member is provided at the joining piece 93. The joined first housing 21 and the second housing 22 are firmly connected by the predetermined tightening tool via the four connection holes 94, to form the integrated housing 2.

In the configuration of the housing 2 described above, in the present embodiment, a protrusion part 28 is provided at the corner of the first side wall part 211 forming the outer peripheral part of the first housing 21, and a second through hole 282 is provided at the corner of the second housing 22. That is, for example, in the first housing 21, a cylinder-shaped protrusion part 28 having a first through hole 281 for inserting a fastening tool 60 (see FIG. 10 and FIG. 11) such as a bolt and a screw, is formed so as to protrude from the first surface part 210. In the second housing 22, the second through hole 282 for fitting the protrusion part 28 is provided.

A plurality of the protrusion parts 28 are provided, and a plurality of the second through holes 282 are provided accordingly. Each of the plurality of the protrusion parts 28 is provided at each of a plurality (four) of corners of the first housing 21. Each of the plurality of the second through holes 282 is provided at each of a plurality (four) of corners of the second housing 22. In the present embodiment, the first surface part 210 of the first housing 21 and the second surface part 220 of the second housing 22 are formed in a substantially rectangular shape in a plan view, and the protrusion part 28 and the second through hole 282 are provided at each of the four corners.

As illustrated in FIG. 4D, in the second housing 22, regions corresponding to the four corners of the second side wall part 222 are formed thicker. The second through hole 282 extending from the second contact surface 272 to the second surface part 220 is formed at a thick part 29. The joining piece 93 is provided outside of each of the four corners of the second side wall part 222.

Figure 6:
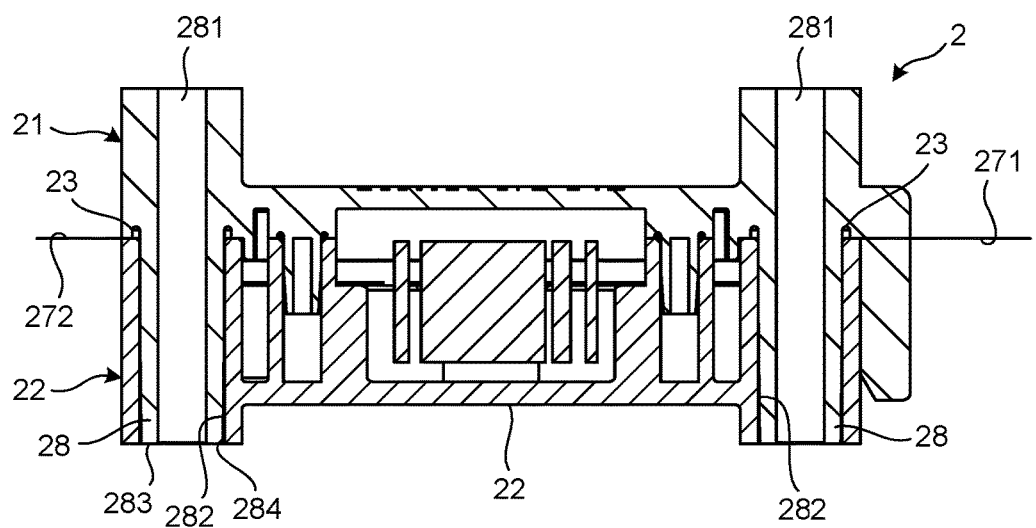
FIG. 6 is a sectional view cut along the line I-I in FIG. 1.
Figure 7:
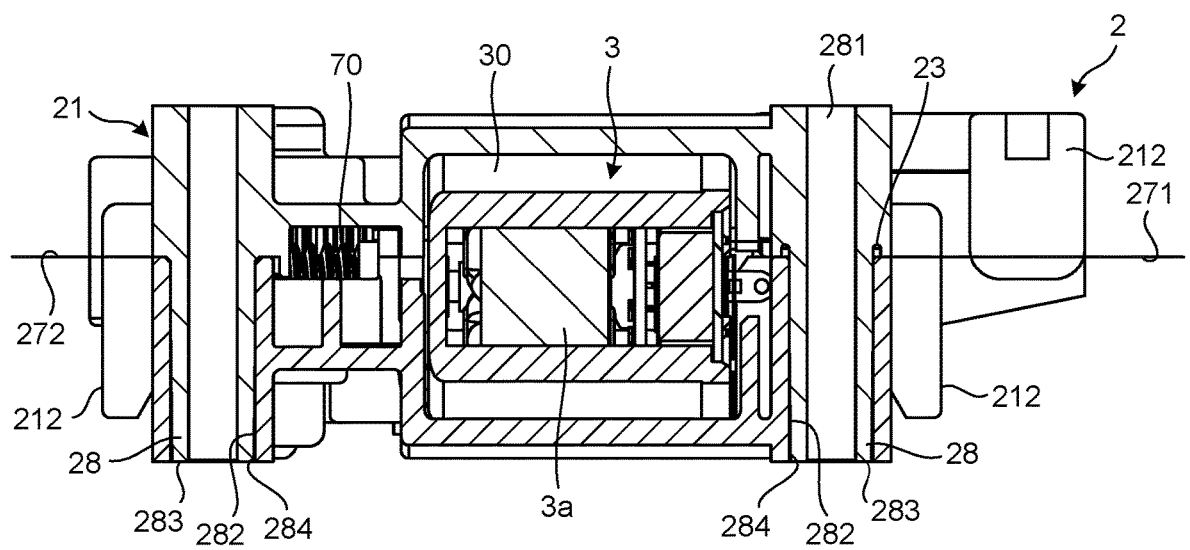
FIG. 7 is a sectional view cut along the line II-II in FIG. 1.
Figure 8:
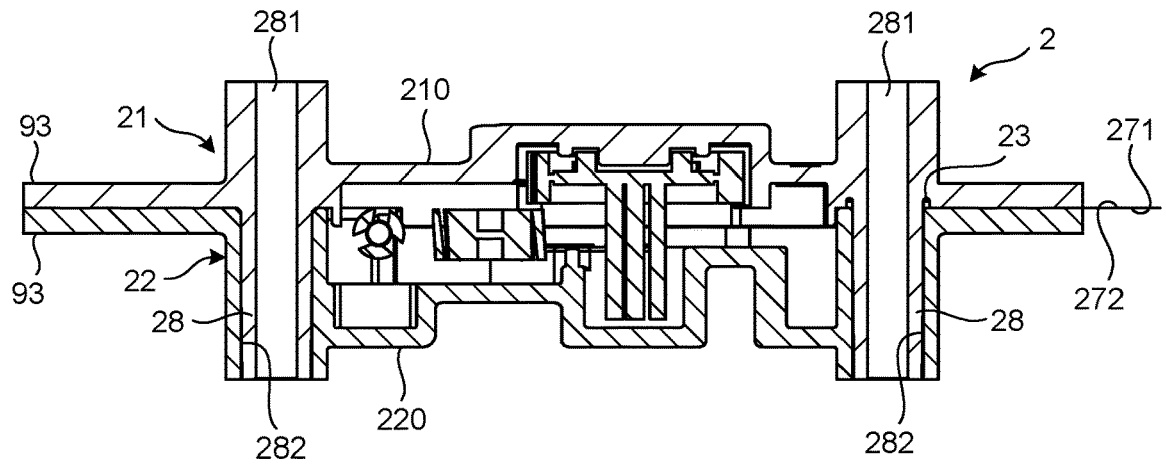
FIG. 8 is a sectional view cut along the line III-III in FIG. 1.
Figure 9:
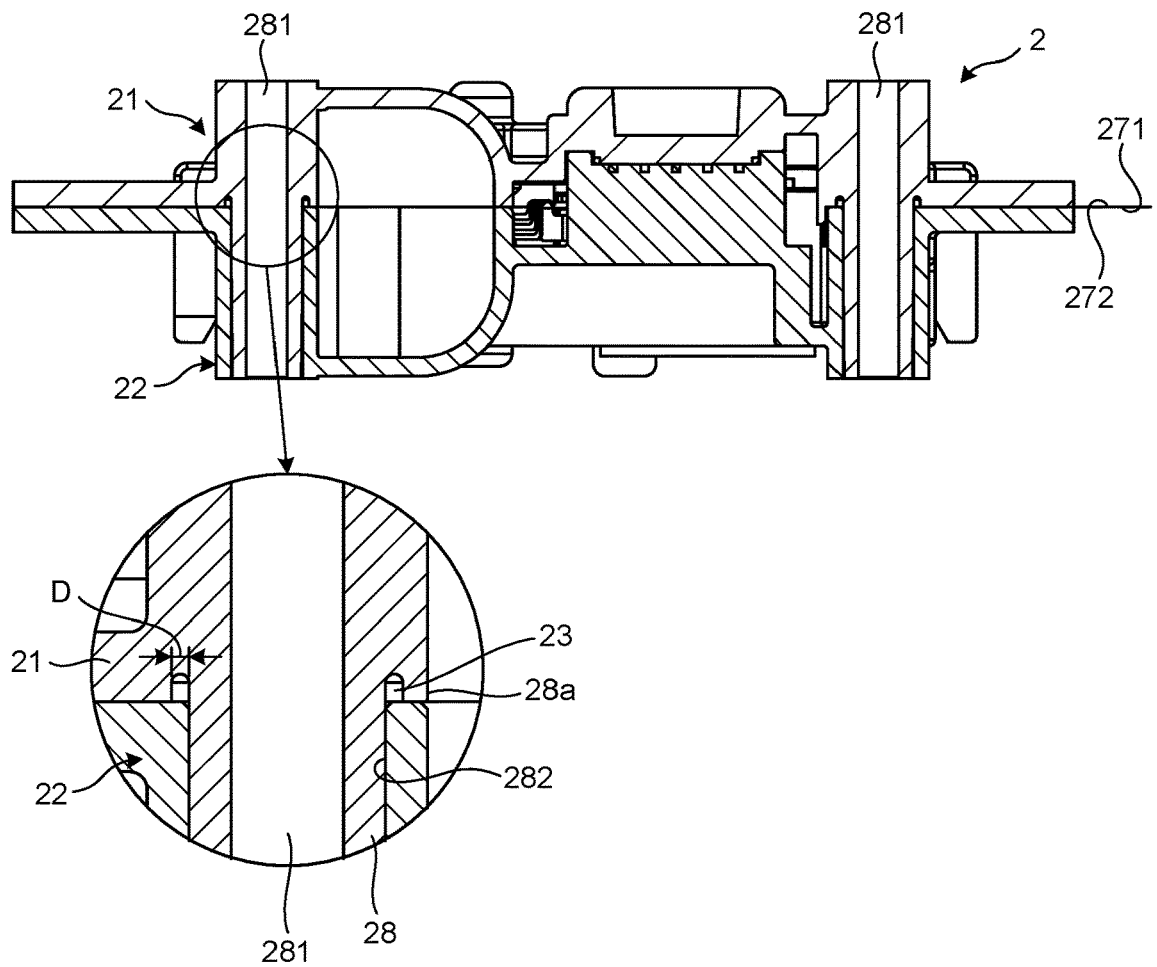
FIG. 9 is a sectional view cut along the line IV-IV in FIG. 1.

In this example, with reference to FIG. 6 to FIG. 11, a mode in which the protrusion part 28 formed at the first housing 21 is fitted into the second through hole 282 formed at the second housing 22 will be described. FIG. 6 is a sectional view cut along the line I-I in FIG. 1. FIG. 7 is a sectional view cut along the line II-II in FIG. 1. FIG. 8 is a sectional view cut along the line III-III in FIG. 1. FIG. 9 is a sectional view cut along the line IV-IV in FIG. 1.

As illustrated in FIG. 6 to FIG. 9, when the first housing 21 and the second housing 22 are abutted and joined to each other, each of the four protrusion parts 28 is fitted by being pressed into each of the four second through holes 282. That is, in the present embodiment, the outer diameter of the protrusion part 28 is made slightly larger than the bore diameter of the second through hole 282 so that the protrusion part 28 is press-fitted into the second through hole 282.

Moreover, in the present embodiment, the length (hereinafter, referred to as a protrusion length) L1 of the protrusion part 28 (see FIG. 10) is made equivalent to the length (total length) L2 of the second through hole 282 (see FIG. 10). In the fitting state, a flat part of an end part (tip end) 283 of the protrusion part 28 and an opening part of an end 284 of the second through hole 282 are positioned substantially on the same plane.

In this manner, in the rotating device according to the embodiment, the housing 2 is formed by fitting the protrusion parts 28 protruding from the four corners of the first surface part 210 of the first housing 21 into the second through holes 282 formed at the four corners of the second housing 22 corresponding to the four protrusion parts 28.

Accordingly, when the first housing 21 and the second housing 22 are molded by resin, and for example, even if warpage occurs in the first housing 21 and the second housing 22 due to the shrinkage of resin, the warpage is corrected by fitting the protrusion parts 28 deeply into the second through holes 282 when the housing 2 is assembled. Hence, it is possible to minimize deviation from the design dimensions of the housing 2 as much as possible. Because the arrangement of the motor 3 and the gear group 6, as well as the meshing accuracy of gears are improved, it is possible to provide the rotating device 1 that suppresses the generation of abnormal noise or the like.

In the examples illustrated in FIG. 6 to FIG. 9, the protrusion length L1 of the protrusion part 28 is equivalent to the total length L2 of the second through hole 282. However, the protrusion length L1 of the protrusion part 28 and the total length L2 of the second through hole 282 only need to satisfy the relation of the following equation 1. By satisfying the relation of the equation 1, for example, even if warpage occurs in the first housing 21 or the second housing 22 during molding, it is possible to correct the warpage that has occurred in one of the housings 21 and 22 when the first housing 21 and the second housing 22 are combined to form the housing 2.

$$0.3 \leq L1/L2 \leq 1.0 \qquad \text{(equation 1)}$$

The protrusion length L1 of the protrusion part 28 is distance from the first contact surface 271 of the first housing 21 to the tip end 283 of the protrusion part 28. The total length L2 of the second through hole 282 is distance from the second surface part 220 of the second housing 22 to the second contact surface 272. Moreover, the above equation 1 indicates that the protrusion length L1 of the protrusion part 28 and the total length L2 of the second through hole 282 are in the relation of $L1 \leq L2$.

Moreover, a relation between thickness H of the housing 2 in a region provided with the protrusion part 28 (see FIG. 10 and FIG. 11) and the protrusion length L1 of the protrusion part 28 preferably satisfies the relation of the following equation 2.

$$0.3*H \leq L1 \leq 0.8*H \qquad \text{(equation 2)}$$

By satisfying the relation of the equation 2, for example, during molding, it is possible to suppress the occurrence of warpage while maintaining the required strength of the first housing 21.

Figure 10:
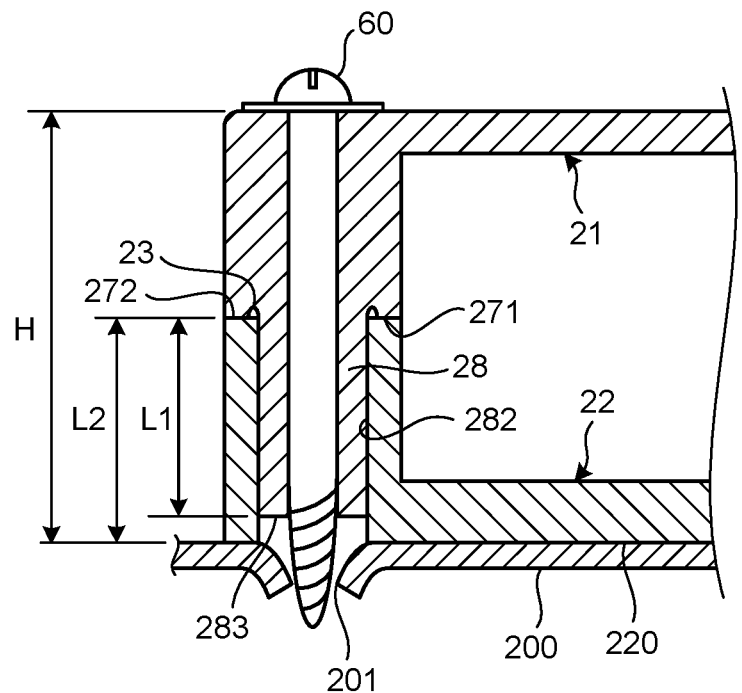
FIG. 10 is a schematic explanatory view illustrating an example of a state in which the rotating device according to the embodiment is mounted on a mounting surface.
Figure 11:
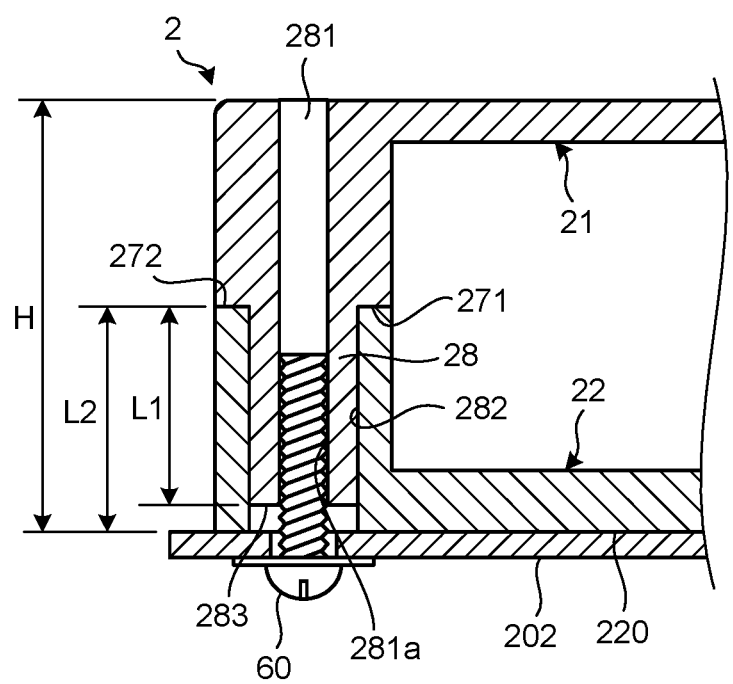
FIG. 11 is a schematic explanatory view illustrating an example of a state in which the rotating device according to the embodiment is mounted on the mounting surface.

FIG. 10 and FIG. 11 are each a schematic explanatory view illustrating an example of a state in which the rotating device 1 according to the embodiment is mounted on a mounting surface. For example, in FIG. 10 and FIG. 11, the protrusion length L1 of the protrusion part 28 is made shorter than the total length L2 of the second through hole 282. However, even when the protrusion length L1 is made shorter, it is preferable to set the protrusion length L1 at least within the range of equation 1. More preferably, the lower limit of the protrusion length L1 of the protrusion part 28 may be equal to or more than a half of the total length L2 of the second through hole 282.

Incidentally, in the example illustrated in FIG. 10, the mounting surface is formed of a sheet metal 200, and a fastening hole 201 is provided by performing a burring process and a tapping process on the sheet metal 200. The rotating device 1 is mounted on the sheet metal 200 by the fastening tool 60, by aligning the fastening hole 201 with the first through hole 281 provided at the protrusion part 28 of the first housing 21. In this process, because the protrusion length L1 of the protrusion part 28 and the total length L2 of the second through hole 282 satisfy the relation of $L1 \leq L2$, when the fastening is carried out via the fastening tool 60, it is possible to bring the first contact surface 271 and the second contact surface 272 into contact with each other securely, by the fastening force of the fastening tool 60.

Moreover, as illustrated in FIG. 9 and FIG. 10, in the rotating device 1 according to the present embodiment, an annular groove part 23 is formed at the first contact surface 271 so as to surround the periphery of the base of the protrusion part 28 provided at the first housing 21 (see FIG. 5).

That is, when the protrusion part 28 of the first housing 21 is to be fitted into the second through hole 282 of the second housing 22, to prevent a situation that the protrusion part 28 does not fit into the second through hole 282 due to a slight misalignment, as illustrated in FIG. 9, the elasticity of the protrusion part 28 formed of resin is increased, by forming an aperture D between a base 28a of the protrusion part 28 and the first contact surface 271. Accordingly, when the tip end of the protrusion part 28 fits the second through hole 282, even if the shaft centers of the protrusion part 28 and the second through hole 282 are slightly misaligned with each other, it is possible to press fit the protrusion part 28 into the second through hole 282.

Furthermore, in the example illustrated in FIG. 11, a female screw part 281a is formed at the inner peripheral surface of the first through hole 281 provided at the protrusion part 28 of the first housing 21, and a predetermined plate body 202 is used as the mounting surface. Then, a hole part 203 formed at the plate body 202 and the first through hole 281 provided at the protrusion part 28 of the first housing 21 are aligned with each other, the fastening tool 60 such as a bolt is inserted into the first through hole 281 from the plate body 202 side, and the rotating device 1 is screwed to the plate body 202.

Figure 12:
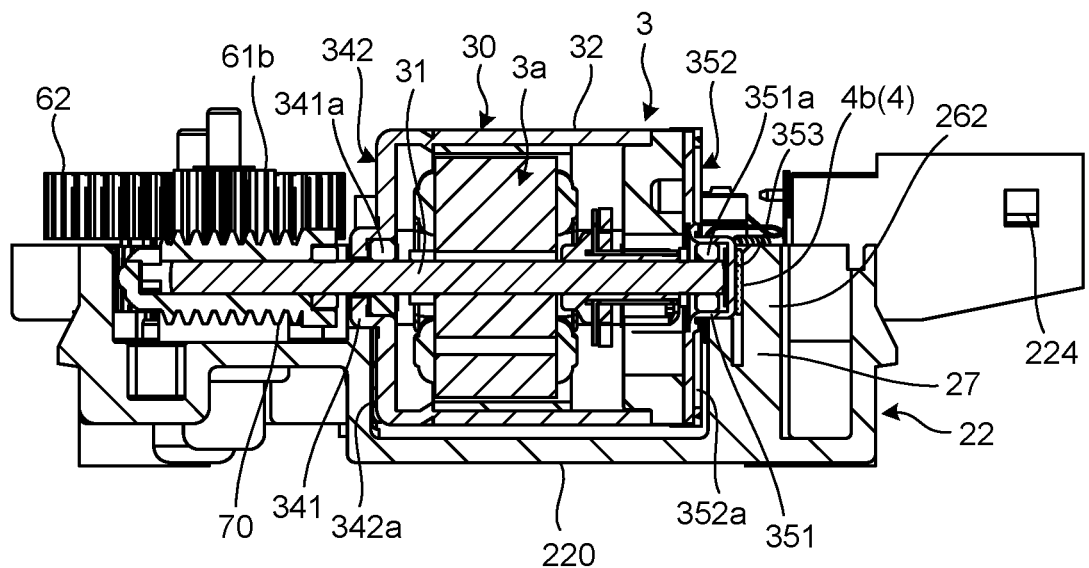
FIG. 12 is a sectional view cut along the line VI-VI in FIG. 4B.
Figure 13:
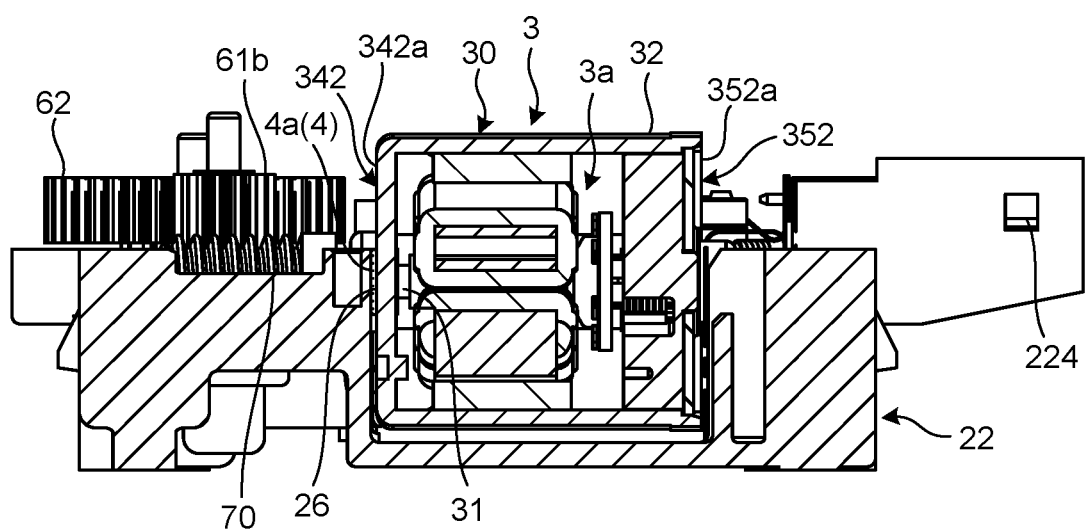
FIG. 13 is a sectional view cut along the line VII-VII in FIG. 4B.
Figure 14:
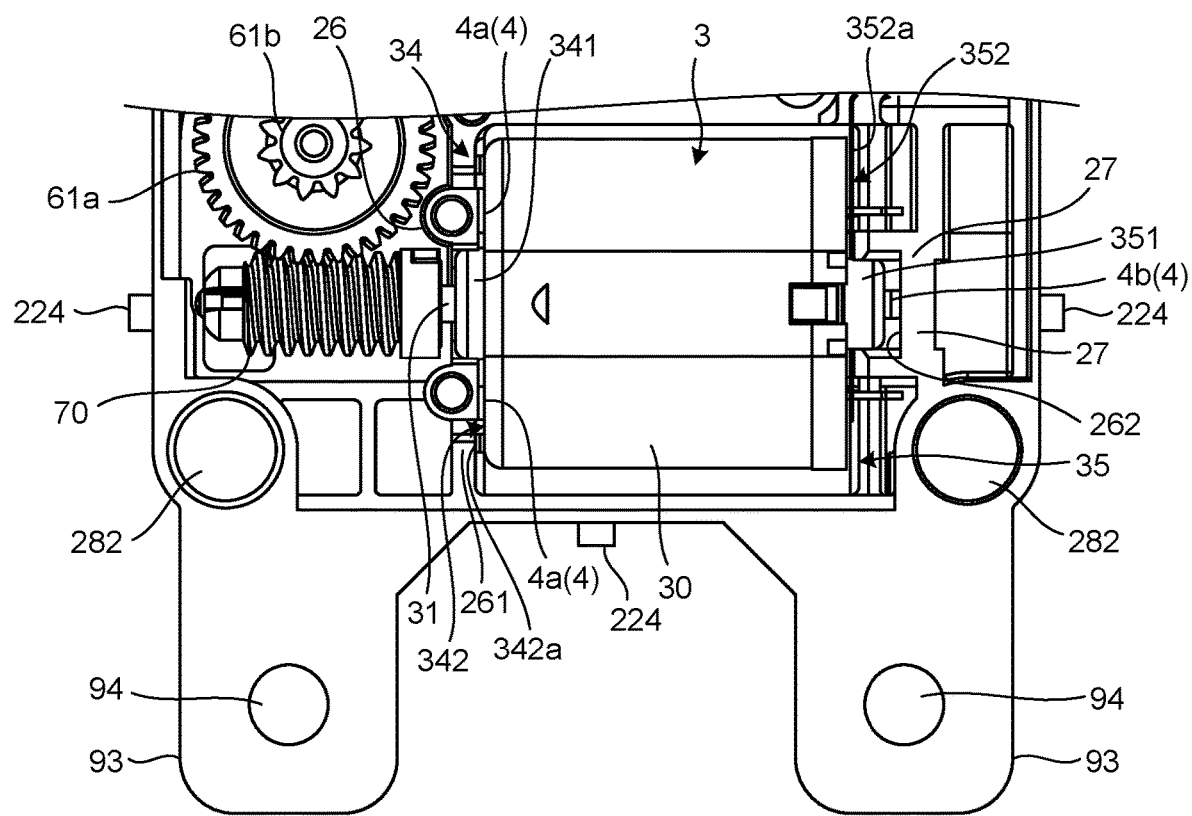
FIG. 14 is an explanatory view illustrating an arrangement of a holding part in the rotating device according to the embodiment in a plan view.
Figure 15:
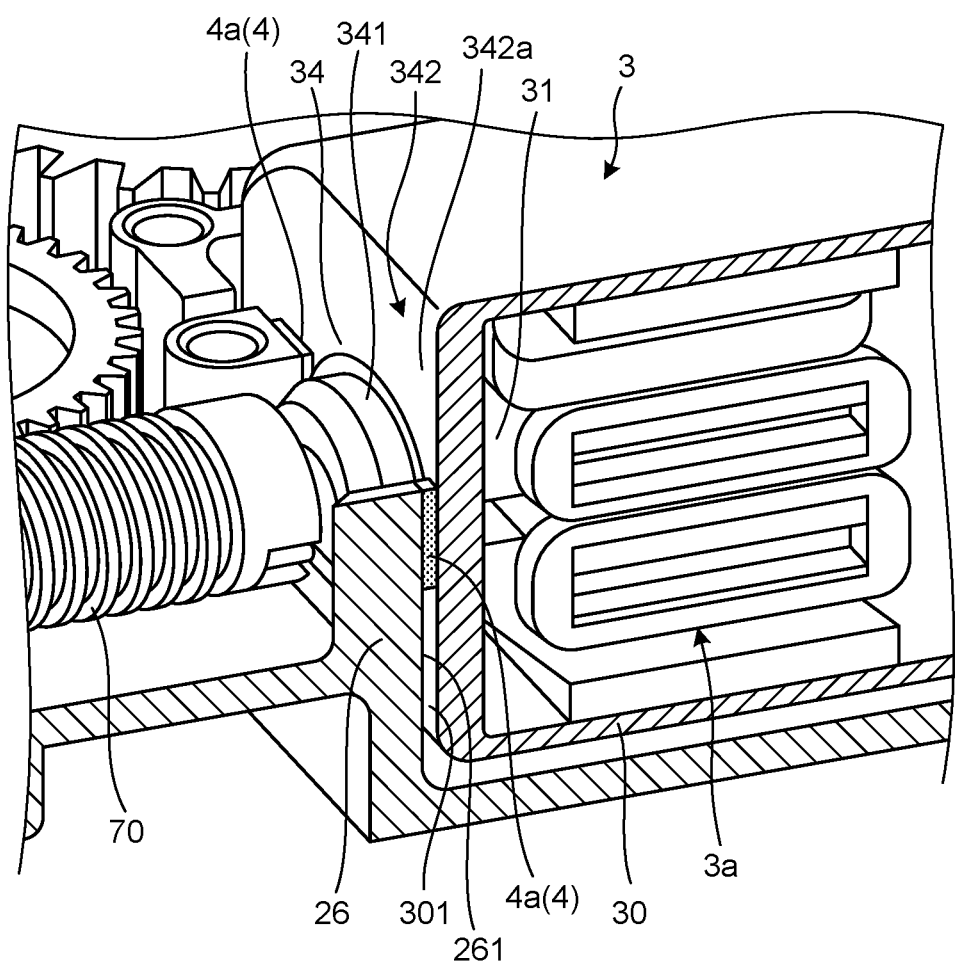
FIG. 15 is an explanatory view of a first holding part when an adhesive having elasticity is used.
Figure 16:
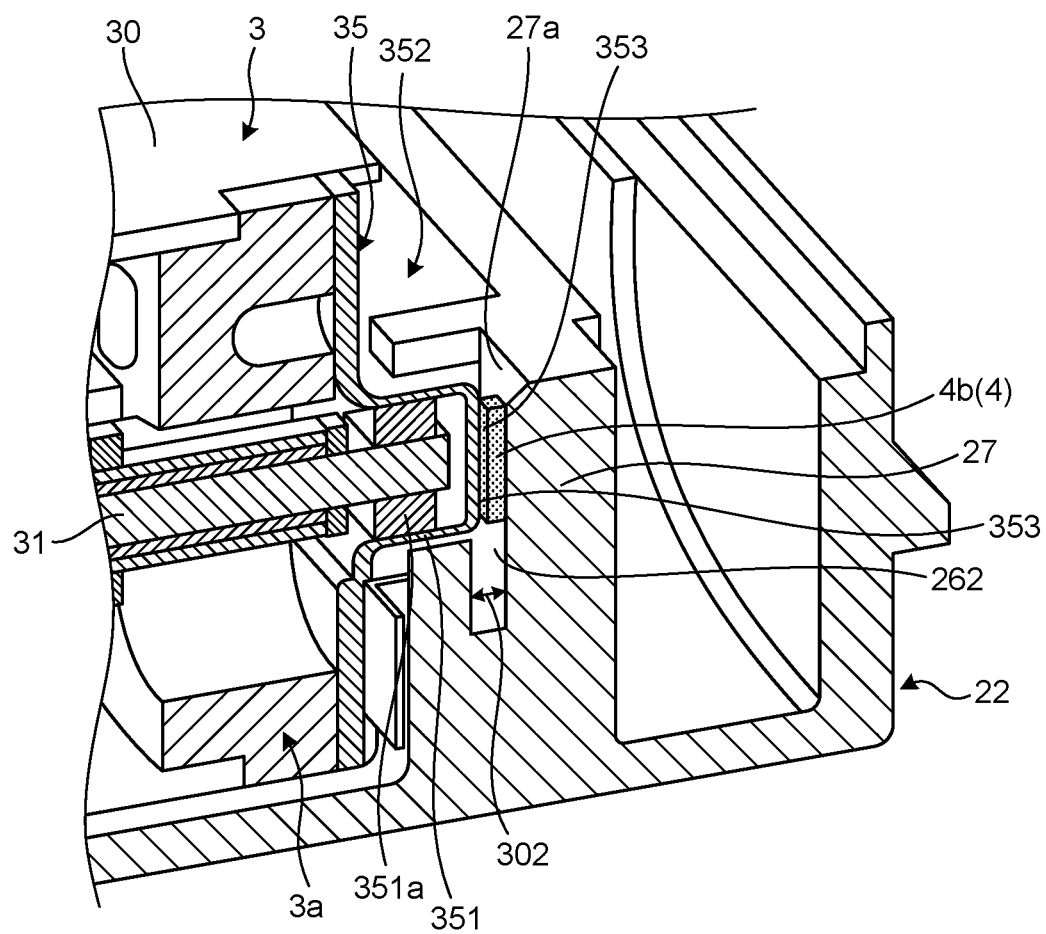
FIG. 16 is an explanatory view of a second holding part when an adhesive having elasticity is used.

Next, a holding structure of the motor 3 in the present embodiment will be described with reference to FIG. 4A, FIG. 4B, FIG. 4D, and FIG. 12 to FIG. 16. FIG. 12 is a sectional view cut along the line VI-VI in FIG. 4B. FIG. 13 is a sectional view cut along the line VII-VII in FIG. 4B. Moreover, FIG. 14 is an explanatory view illustrating an arrangement of a holding part in the rotating device 1 according to the embodiment in a plan view. Furthermore, FIG. 15 is an explanatory view of a first holding part when a resin member having elasticity (hereinafter, referred to as an adhesive having elasticity) is used. FIG. 16 is an explanatory view of a second holding part when an adhesive having elasticity is used.

First, the configuration of the motor 3 will be briefly described. As illustrated in FIG. 4A and FIG. 4B, the motor 3 in the present embodiment includes the rotating shaft 31 and a frame 30 accommodating a function unit 3a (see FIG. 7, FIG. 12, FIG. 13, and FIG. 15). In this example, the function unit 3a is a set of components required to drive the motor 3, such as a stator and a rotor including a magnet, a coil, and the like, other than the rotating shaft 31. That is, the motor 3 includes the frame 30 and the rotating shaft 31 connected to the worm gear 70. The frame 30 includes a tubular-shaped body 32 extending in the axial direction of the motor 3, and end parts (a first end part 34 and a second end part 35) in the axial direction.

Moreover, the frame 30 includes a first outer side surface on the first end part 34 side and a second outer side surface at the second end part side. In other words, the first outer side surface includes a portion of the outer side surface forming the first end part 34, and a portion of the outer side surface surrounding the first end part 34. Hereinafter, the portion of the outer side surface surrounding the first end part 34 is referred to as a third outer side surface 342a. Similarly, the second outer side surface forms the second end part 35 of the frame 30. That is, the second outer side surface includes a portion of the outer side surface forming the second end part 35, and a portion of the outer side surface surrounding the second end part 35. Hereinafter, the portion of the outer side surface surrounding the second end part 35 is referred to as a fourth outer side surface 352a. Furthermore, the first end part 34 and the second end part 35 in the tubular-shaped body 32 each has a surface, and the rotating shaft 31 protrudes from the surface of the first end part 34. The worm gear 70 meshing with the first transmission gear 61 is mounted on the protruded portion.

As illustrated in FIG. 12 to FIG. 14, the first end part 34 includes a first bearing part 341 for rotatably supporting the rotating shaft 31 on the worm gear 70 side via a bearing 341a, and a first side part 342 extending in a direction intersecting the axial direction. The first side part 342 includes the third outer side surface 342a that is a surface intersecting the axial direction (vertical surface), and that is formed continuously to the first bearing part 341. Alternatively, the second end part 35 includes a second bearing part 351 for rotatably supporting the end part of the rotating shaft 31 on the side opposite to the worm gear 70 via a bearing 351a, and a second side part 352 extending in a direction intersecting the axial direction. The second side part 352 includes the fourth outer side surface 352a that is a surface intersecting the axial direction (vertical surface), and that is formed continuously to the second bearing part 351.

The first bearing part 341 includes the bearing 341a (see FIG. 12), and the first end part 34 of the frame 30. The second bearing part 351 includes the bearing 351a (see FIG. 12 and FIG. 16), and the second end part 35 of the frame 30. The first end part 34 includes the third outer side surface 342a intersecting the axial direction, and the second end part 35 includes the fourth outer side surface 352a intersecting the axial direction.

On the other hand, as illustrated in FIG. 4D, a motor arrangement part 228 is provided in the second housing 22, and the motor 3 is placed in the motor arrangement part 228 (see FIG. 4B). On the motor arrangement part 228, a first holding wall 26 serving as a wall part and a second holding wall 27 serving as a wall part are formed. Each of the first holding wall 26 and the second holding wall 27 faces the first end part 34 and the second end part 35 of the frame 30 in the motor 3 respectively. The first holding wall 26 and the second holding wall 27 include surfaces 261 and 262 extending in a direction intersecting the axial direction (surfaces perpendicular to the axial direction). The first holding wall 26 and the second holding wall 27 each function as a holding part of the motor 3 in the present embodiment, and the first holding wall 26 corresponds to a first holding part, and the second holding wall 27 corresponds to a second holding part.

A first recessed part 26a recessed toward the inside of the second housing 22 is formed at the first holding wall 26. The first bearing part 341 of the motor 3 is engaged with the first recessed part 26a, and the second bearing part 351 of the motor 3 is engaged with a second recessed part 26b formed at the second holding wall 27.

When the rotating shaft 31 of the motor 3 described above accommodated in the housing 2 is rotated, the reaction force is applied in the axial direction of the motor 3 via the worm gear 70. The reaction force causes the motor 3 to instantaneously move in the axial direction. When the motor 3 is moved, the meshing state between the worm gear 70 and the first transmission gear 61 is changed, and may cause abnormal noise.

Accordingly, as illustrated in FIG. 12 to FIG. 14, the motor 3 in the rotating device 1 according to the present embodiment is held by the holding part (first holding wall 26 (may also be referred to as a first holding part) and second holding wall 27 (may also be referred to as a second holding part)) formed in the housing 2 via a resin member 4 having elasticity (hereinafter, referred to as an adhesive having elasticity).

Moreover, the adhesive 4 having elasticity is disposed between the surface of the holding part (first holding wall 26 and second holding wall 27) intersecting the axial direction and the end parts 34 and 35 of the frame 30. When the end part 34 in the axial direction is the first end part 34, the frame 30 includes the second end part 35. When the surface intersecting the axial direction of the first holding wall 26 is the first holding surface 261 intersecting the axial direction on the first end part 34 side in the frame 30, the holding part includes the second holding surface 262 intersecting the axial direction on the second end part 35 side. When the adhesive 4 having elasticity is a first adhesive 4a having elasticity, a second adhesive 4b having elasticity is disposed between the second end part 35 and the second holding surface 262 intersecting the axial direction on the second end part 35 side.

More specifically, at least one of a known rubber-based adhesive, a silicone-based adhesive, a modified silicone-based adhesive, a urethane-based adhesive, or an epoxy-based adhesive may be suitably used as the adhesive 4 having elasticity, and the adhesive has a predetermined elasticity even after being hardened. As illustrated in FIG. 14 to FIG. 16, the adhesive 4 having elasticity is disposed between the first holding surface 261 perpendicular to the axial direction in the first holding wall 26 and the first end part 34 of the frame 30, and between the second holding surface 262 perpendicular to the axial direction in the second holding wall 27 and the second end part 35 of the frame 30.

In this process, the first end part 34 facing the first holding surface 261 of the first holding wall 26 is the third outer side surface 342a, and the second end part 35 facing the second holding surface 262 of the second holding wall 27 is an outer surface (vertical outer surface) 353 intersecting the axial direction of the second bearing part 351.

That is, as illustrated in FIG. 15, a gap 301 is formed between the first holding surface 261 of the first holding wall 26 and the third outer side surface 342a of the first end part 34 in the frame 30 facing each other, so as enough to dispose the adhesive 4 having elasticity. Similarly, as illustrated in FIG. 16, a gap 302 to dispose the adhesive 4 having elasticity is also formed between the second holding surface 262 of the second holding wall 27 and the outer surface 353 of the second bearing part 351 in the frame 30. The size of the gaps 301 and 302 is, for example, 0.2 mm. It may be smaller than the thickness of the first bearing part 341 in the axial direction, and may be smaller than the thickness of the first holding wall 26 in the axial direction.

In this manner, in the rotating device 1 according to the present embodiment, the motor 3 is held by the holding part formed in the housing 2 via the adhesive 4 having elasticity. Accordingly, even at a low cost, by absorbing the reaction force applied in the axial direction of the motor 3, it is possible to suppress the motor 3 from moving in the axial direction, and also suppress the generation of abnormal noise caused by the movement of the motor 3.

Similarly, in the rotating device 1 according to the present embodiment, the motor 3 is held by disposing the adhesive 4 having elasticity between the second holding surface 262 of the second holding wall 27 being the holding part formed in the housing 2, and the outer surface 353 of the second bearing part 351 in the frame 30. Accordingly, with such a configuration also, by absorbing the reaction force applied in the axial direction of the motor 3, it is possible to suppress the motor 3 from moving in the axial direction, and thus suppress the generation of abnormal noise caused by the movement of the motor 3.

Incidentally, in the present embodiment, as illustrated in FIG. 16, a inclined surface 27a is formed at the upper part of the second holding wall 27 (on the first housing 21 side) where the gap width becomes wider toward the surface part of the housing 2, so that the adhesive 4 having elasticity can be easily filled into the gap 302. Such a inclined surface 27a may also be formed at the first holding wall 26 in addition to the second holding wall 27.

Figure 17A:
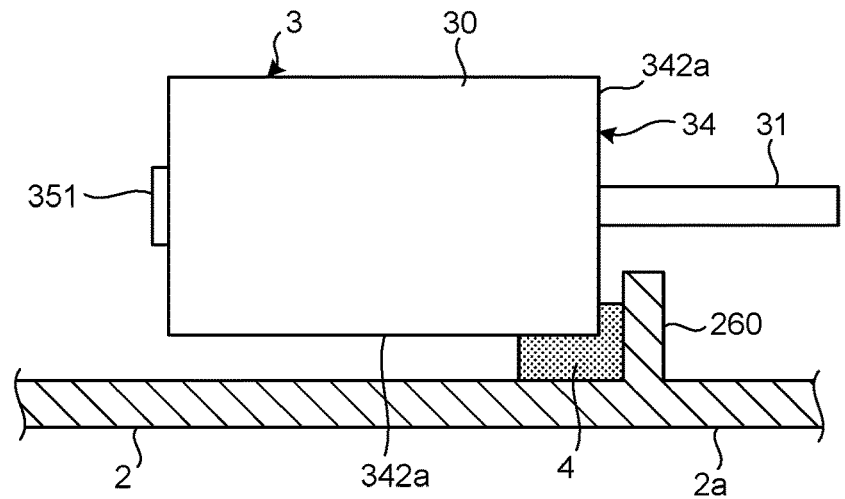
FIG. 17A is a schematic explanatory view illustrating a first modification of a support structure of a motor in the rotating device according to the embodiment.
Figure 17B:
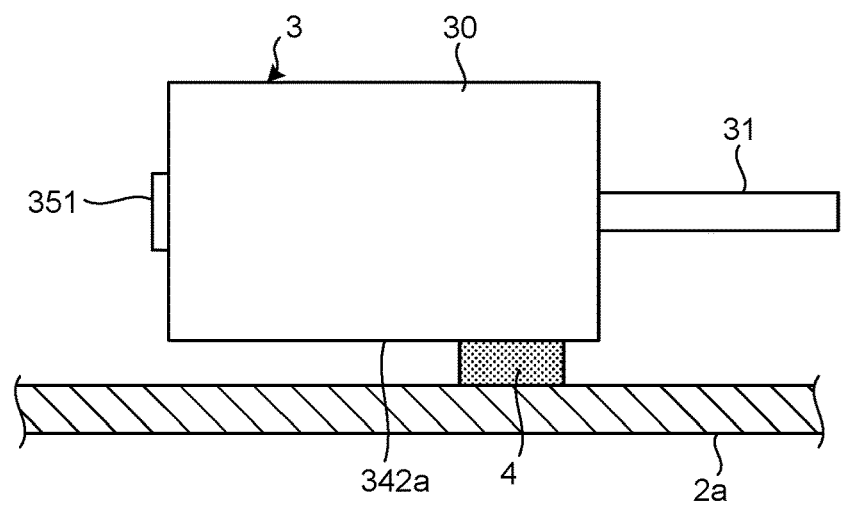
FIG. 17B is a schematic explanatory view illustrating a second modification of the support structure of the motor in the rotating device according to the embodiment.
Figure 17C:
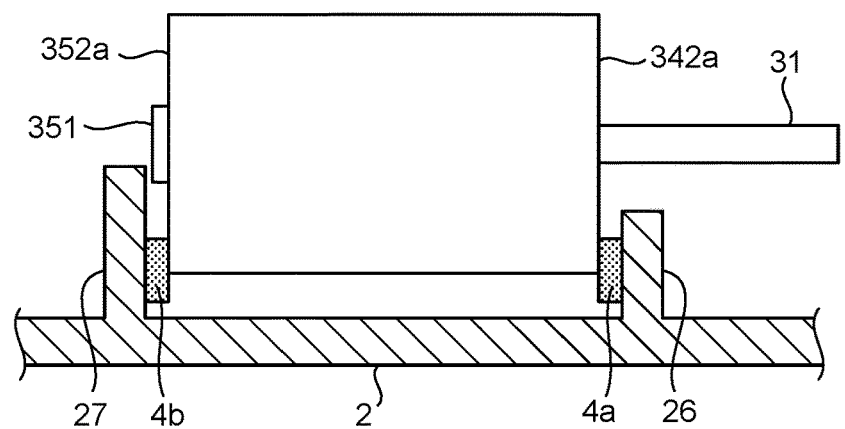
FIG. 17C is a schematic explanatory view illustrating a third modification of the support structure of the motor in the rotating device according to the embodiment.

The support structure of the motor 3 in the rotating device 1 according to the embodiment is not limited to the examples described above, and for example, may also be configured as illustrated in FIG. 17A to FIG. 17C. FIG. 17A is a schematic explanatory view illustrating a first modification of a support structure of the motor 3 in the rotating device 1 according to the embodiment. FIG. 17B is a schematic explanatory view illustrating a second modification of the support structure of the motor 3 in the rotating device 1 according to the embodiment. FIG. 17C is a schematic explanatory view illustrating a third modification of the support structure of the motor 3 in the rotating device 1 according to the embodiment.

As illustrated in FIG. 17A, it is also possible to support the motor 3, by disposing the adhesive 4 having elasticity between the area extending over an outer peripheral side surface 30a of the frame 30 and the third outer side surface 342a of the first end part 34, and a holding wall 260 formed at the inside of a wall part 2a of the housing 2.

Alternatively, as illustrated in FIG. 17B, it is possible to support the motor 3, by disposing the adhesive 4 having elasticity at any position between the outer peripheral side surface 30a of the frame 30 and the inside of the wall part 2a of the housing 2.

Moreover, as illustrated in FIG. 17C, it is also possible to support the motor 3, by disposing the first adhesive 4a having elasticity between the first holding wall 26 formed at the inside of the wall part 2a of the housing 2 and the third outer side surface 342a of the first end part 34 of the frame 30, and by disposing the second adhesive 4b having elasticity between the second holding wall 27 formed at the inside of the wall part 2a of the housing 2 and the fourth outer side surface 352a of the second end part 35.

In this manner, it is possible to firmly support the motor 3 and suppress the generation of abnormal noise, by disposing the adhesive 4 having elasticity between the outer side surface of the frame 30 and the surface of the holding part intersecting the axial direction.

Figure 18A:
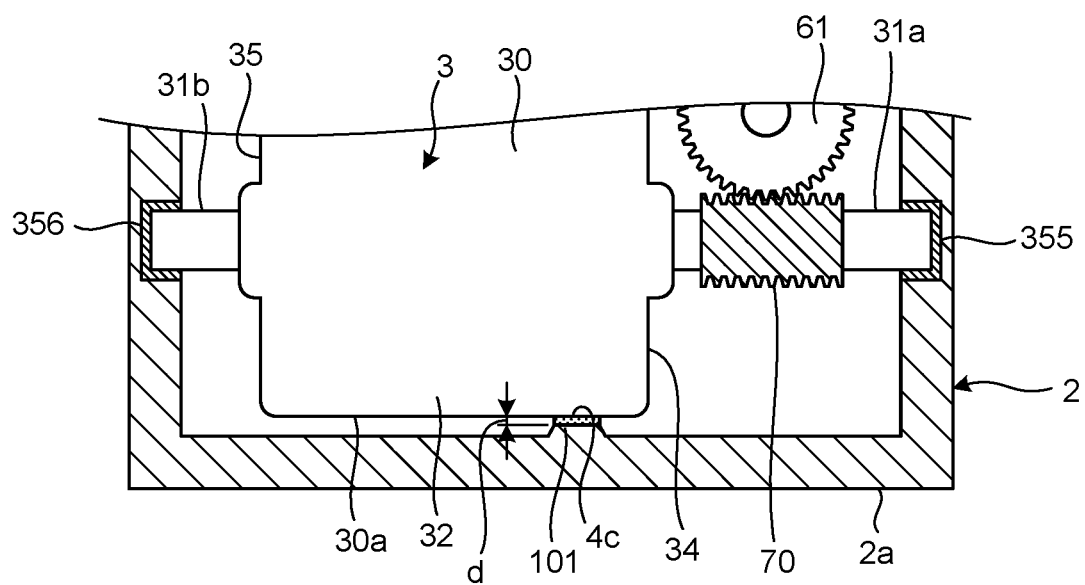
FIG. 18A is a schematic explanatory view illustrating a support structure of a motor of a rotating device according to another embodiment.

Next, a support structure of the motor 3 in the rotating device 1 according to another embodiment will be described. FIG. 18A is a schematic explanatory view illustrating a support structure of the motor 3 in the rotating device 1 according to another embodiment. As illustrated in FIG. 18A, the motor 3 of another embodiment is the type of the rotating shaft 31 of which protrudes from both sides of the frame 30. As illustrated in FIG. 18A, in the rotating shaft 31 of the motor 3 in another embodiment, a portion protruding from the first end part 34 and installed with the worm gear 70 is referred to as a first protrusion axis 31a, and a portion protruding from the second end part 35 is referred to as a second protrusion axis 31b.

The end part of the first protrusion axis 31a is supported by a first bearing 355 to be a third holding part, at the wall part 2a of the housing 2. The end part of the second protrusion axis 31b is supported by a second bearing 356 to be a fourth holding part, at the wall part 2a of the housing 2.

Accordingly, because the rotating shaft 31 of the motor 3 is supported by the wall part 2a of the housing 2 via the first bearing 355 and the second bearing 356, the movement of the motor 3 in the axial direction is structurally restricted. On the other hand, in the motor 3 of such a type, when the rotating shaft 31 is rotated, the frame 30 accommodating the function unit 3a (see FIG. 16 and the like) may be rotated by the reaction force.

Consequently, in this example, as a fifth holding part for holding the tubular-shaped body 32 of the frame 30, a motor holding part 101 is formed at the wall part 2a of the housing 2, and a third adhesive 4c having elasticity is disposed between the wall part 2a of the housing 2 and the outer peripheral side surface 30a of the tubular-shaped body 32 of the frame 30. A gap d is provided between the outer peripheral side surface of the tubular-shaped body 32 and the wall part 2a of the housing 2 to be a surface of the motor holding part 101, so as enough to dispose the third adhesive 4c having elasticity.

With such a configuration, it is possible to suppress the frame 30 of the motor 3 from turning in the housing 2, and suppress the generation of abnormal noise caused by turning.

Figure 18B:
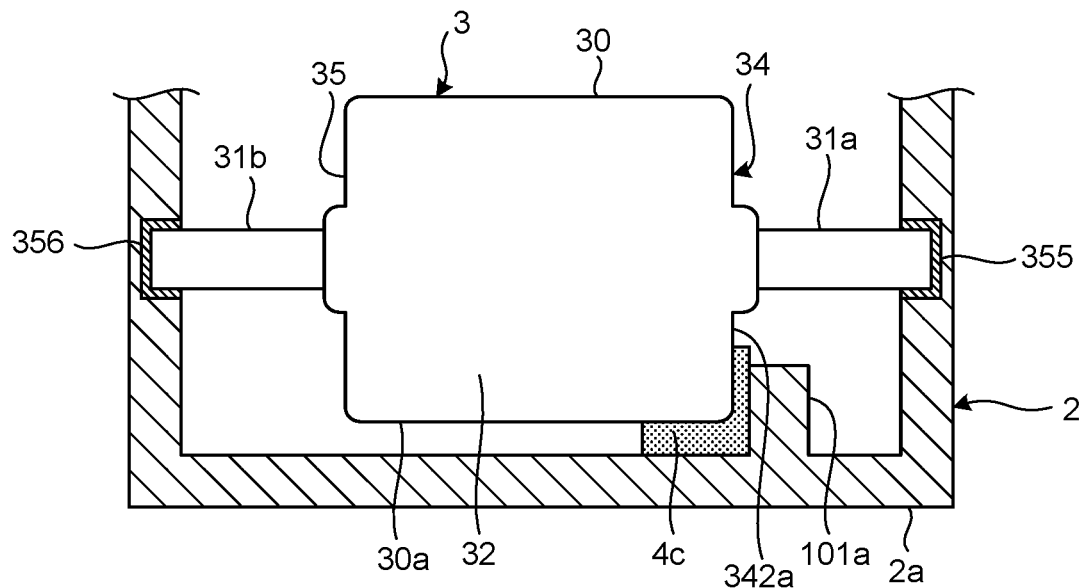
FIG. 18B is a schematic explanatory view illustrating a first modification of the support structure of the motor in the rotating device according to another embodiment.
Figure 18C:
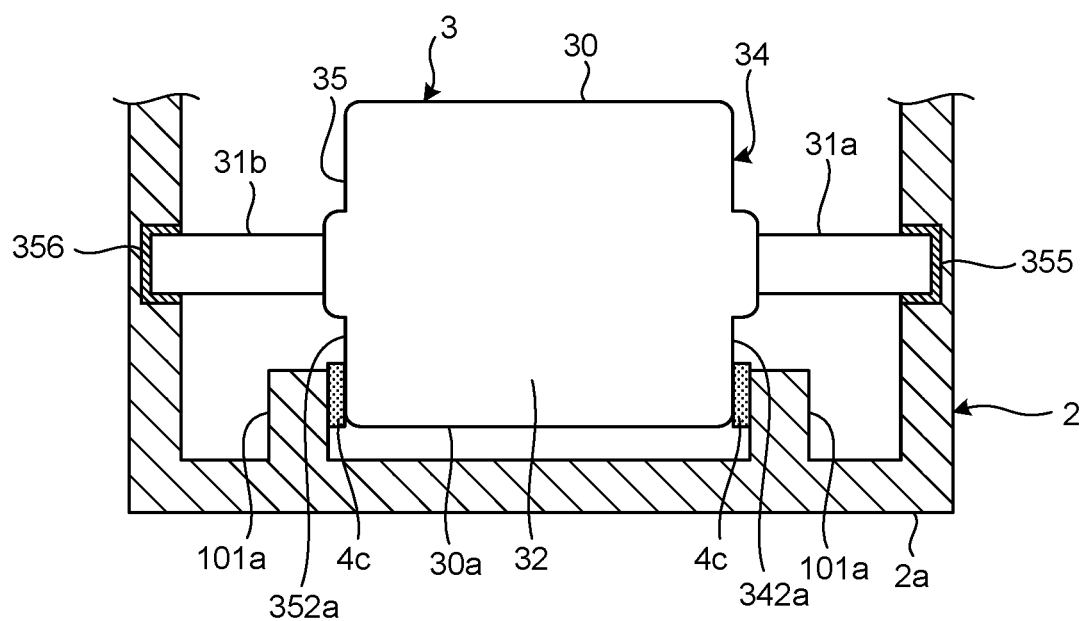
FIG. 18C is a schematic explanatory view illustrating a second modification of the support structure of the motor in the rotating device according to another embodiment.

When the motor 3 in the rotating device 1 according to another embodiment is the type of the rotating shaft 31 of which protrudes from both sides of the frame 30, the support structure of the motor 3 may also be configured as illustrated in FIG. 18B and FIG. 18C. FIG. 18B is a schematic explanatory view illustrating a first modification of the support structure of the motor 3 in the rotating device 1 according to another embodiment. FIG. 18C is a schematic explanatory view illustrating a second modification of the support structure of the motor 3 in the rotating device 1 according to another embodiment.

As illustrated in FIG. 18B, it is also possible to support the motor 3, by disposing the third adhesive 4c having elasticity between an area extending over the outer peripheral side surface 30a of the frame 30 and the third outer side surface 342a of the first end part 34, and a wall-like motor holding part 101a formed at the inside of the wall part 2a of the housing 2.

Moreover, as illustrated in FIG. 18C, it is also possible to support the motor 3, by providing the wall-like motor holding part 101a on the first end part 34 side and the second end part 35 side of the frame 30 in the motor 3, and disposing the third adhesive 4c having elasticity between one motor holding part 101a and the third outer side surface 342a of the first end part 34, and between the other motor holding part 101a and the third outer side surface 342a of the second end part 35.

In this manner, even if the motor 3 is the type of the rotating shaft 31 of which protrudes from both sides of the frame 30, by disposing the adhesive 4 having elasticity between the outer side surface of the frame 30 and the surface of the holding part intersecting the axial direction, it is possible to support the motor 3 and suppress the generation of abnormal noise.

In the examples illustrated in FIG. 18A to FIG. 18C, the motor holding part 101 serving as the third holding part protrudes inwardly from the wall part 2a of the housing 2. However, the size and shape of the motor holding part 101 are not limited in any way. In the wall part 2a of the housing 2, the surface adhered with the third adhesive 4c having elasticity may be the motor holding part 101.

Moreover, the third holding part illustrated in the present embodiment is also applicable to the type of the motor 3 of the rotating shaft 31 of which protrudes toward one side illustrated in the prior embodiment.

According to the embodiment described above, the following rotating device 1 can be implemented.

(1) The rotating device 1 including the housing 2 having the first housing 21 and the second housing 22 opposing each other; the motor 3 accommodated in the housing 2; and the output gear 5 for transmitting the rotation of the motor 3 to the external device, wherein in the first housing 21, the cylinder-shaped protrusion part 28 having the first through hole 281 is formed, and in the second housing 22, the second through hole 282 for fitting the protrusion part 28 is provided.

According to the rotating device 1 having such a configuration, even if warpage occurs in the first housing 21 and the second housing 22 during molding, it is possible to correct the warpage in the first housing 21 and the second housing 22, when the first housing 21 and the second housing 22 are assembled and the protrusion part 28 is fitted into the second through hole 282. Accordingly, because the dimensional accuracy of the housing 2 is improved, and the accommodated motor 3 and the gear group 6 including the output gear 5 accurately mesh with each other, it is possible to suppress the generation of abnormal noise.

(2) The rotating device 1 according to the above description (1), wherein the outer diameter of the cylinder-shaped protrusion part 28 is larger than the bore diameter of the second through hole 282.

With such a configuration, the protrusion part 28 can be firmly press-fitted into the second through hole 282, and the correction of the warpage in the above description (1) can be further improved.

(3) The rotating device 1 according to the above description (1) or (2), wherein the protrusion part 28 is provided at the corner of the outer peripheral part of the first housing 21, and the second through hole 282 is provided at the corner of the second housing 22.

With such a configuration, it is possible to improve the ability of correcting the warpage described in the above description (2), and improve the ability of suppressing the generation of abnormal noise.

(4) The rotating device 1 according to any one of the above descriptions (1) to (3), wherein a plurality of the protrusion parts 28 are provided, a plurality of the second through holes 282 are provided, the plurality of protrusion parts 28 are provided at a plurality of respective corners of the first housing 21, and the plurality of second through holes 282 are provided at a plurality of respective corners of the second housing 22.

With such a configuration, it is possible to improve the ability of correcting the warpage described in any one of the above descriptions (1) to (3), and improve the ability of suppressing the generation of abnormal noise.

(5) The rotating device 1 according to any one of the above descriptions (1) to (4), wherein the first housing 21 and the second housing 22 include the first contact surface 271 and the second contact surface 272 coming into contact with each other, respectively, the first housing 21 includes the first surface part 210 to be the top surface part of the housing 2, the protrusion part 28 protrudes from the first contact surface 271, the second housing 22 includes the second surface part 220 to be the bottom surface part of the housing 2, and the second through hole 282 extends from the second contact surface 272 to the second surface part 220.

With such a configuration, it is possible to configure the housing 2 in a desirable shape, by the first housing 21 and the second housing 22, while correcting the warpage described in any one of the above descriptions (1) to (4).

(6) The rotating device 1 according to the above description (5), wherein the first surface part 210 and the second surface part 220 each include a plurality of corners, and the protrusion part 28 and the second through hole 282 are formed at the plurality of corners.

With such a configuration, it is possible to easily form the first housing 21 and the second housing 22 having sufficient rigidity by resin molding, while allowing the correction of the warpage described in the above description (5).

(7) The rotating device 1 according to the above description (6), wherein the second housing 22 includes the second side wall part 222 provided at the outer periphery of the second surface part 220, and the second through hole 282 is formed at the thick part 29 formed at the corner of the second side wall part 222.

With such a configuration, it is possible to form the second housing 22 having sufficient rigidity, regardless of the bore diameter of the second through hole 282.

(8) The rotating device 1 according to any one of the above descriptions (5) to (7), wherein the protrusion length L1 of the protrusion part 28 and the thickness H of the housing 2 in a region provided with the protrusion part 28 satisfy the relation of $0.3*H \leq L1 \leq 0.8*H$.

With such a configuration, it is possible to further improve the ability of suppressing the generation of abnormal noise, regardless of the thickness of the housing.

(9) The rotating device 1 according to any one of the above descriptions (5) to (8), wherein the protrusion length L1 of the protrusion part 28 and the total length L2 of the second through hole 282 satisfy the relation of $L1 \leq L2$.

With such a configuration, when fastening via a fastening tool, the fastening force of the fastening tool ensures that the first contact surface and the second contact surface are in contact with each other, and the first housing and the second housing can be assembled more securely.

(10) The rotating device 1 according to any one of the above descriptions (5) to (9), wherein the protrusion length L1 of the protrusion part 28 and the total length L2 of the second through hole 282 satisfy the relation of $0.3 \leq L1/L2 \leq 1.0$.

With such a configuration, it is possible to form the first housing 21 and the second housing 22 having sufficient rigidity more securely, while allowing the correction of the warpage as described in the above descriptions (5) to (9).

(11) The rotating device 1 according to any one of the above descriptions (5) to (10), wherein on the first contact surface 271, the annular groove part 23 surrounding the protrusion part 28 is formed.

With such a configuration, it is possible to form the first housing 21 and the second housing 22 having sufficient rigidity more securely, while allowing the correction of the warpage as described in the above descriptions (5) to (10), and easily fit the protrusion part 28 into the second through hole 282.

(12) The rotating device 1 according to any one of the above descriptions (1) to (11), capable of being mounted on a predetermined mounting surface (for example, the sheet metal 200 and the plate body 202) via the fastening tool 60 to be inserted into the first through hole 281.

With such a configuration, it is possible to easily mount the rotating device 1 on a desirable position according to the use.

(13) The rotating device 1 including the motor 3, the output gear 5 for transmitting the rotation of the motor 3 to the external device, and the housing 2 accommodating the motor 3 and the output gear 5, wherein the motor 3 is held by the holding part (first holding wall 26 and second holding wall 27) formed in the housing 2 via the adhesive 4 having elasticity.

According to the rotating device 1 having such a configuration, it is possible to suppress the generation of abnormal noise while suppressing the increase in cost.

(14) The rotating device 1 according to the above description (13), wherein the motor 3 includes the frame 30 and the rotating shaft 31 connected to the output gear 5, the frame 30 includes the tubular-shaped body 32 and the third outer side surface 342a forming the first end part 34 in the axial direction, the first holding wall 26 includes the surface 261 intersecting the axial direction, and the adhesive 4 having elasticity is disposed between the surface 261 of the first holding wall 26 intersecting the axial direction and the third outer side surface 342a of the frame 30.

With such a configuration, it is possible to suppress the motor 3 from moving in the axial direction, and suppress the generation of abnormal noise more securely, while suppressing the increase in cost.

(15) The rotating device 1 according to the above description (14), wherein the adhesive 4 having elasticity is disposed between the surface 262 of the second holding wall 27 intersecting the axial direction and the second end part 35 of the frame 30.

With such a configuration also, it is possible to suppress the motor 3 from moving in the axial direction, and suppress the generation of abnormal noise more securely, while suppressing the increase in cost.

(16) The rotating device 1 according to the above description (14) or (15), wherein the frame 30, when the end part in the axial direction is the first end part 34, and when the outer side surface forming the first end part 34 is the first outer side surface, includes the second outer side surface forming the second end part 35, and when the holding part is the first holding wall 26, includes the second holding wall 27; the second holding wall 27, when the surface intersecting the axial direction is the surface intersecting the axial direction on the first outer side surface side of the frame 30, includes the surface intersecting the axial direction on the second outer side surface side, and when the adhesive 4 having elasticity is the first adhesive 4a having elasticity, includes the second adhesive 4b having elasticity; and the second adhesive 4b having elasticity is disposed between the second outer side surface side and the surface intersecting the axial direction on the second outer side surface side. In other words, in the rotating device 1, the frame 30 includes the first outer side surface forming the first end part 34 serving as the end part in the axial direction, and the second outer side surface forming the second end part 35 on the side opposite to the first outer side surface forming the first end part 34; the holding part (first holding wall 26 and second holding part 27) includes the first holding surface 261 intersecting the axial direction on the first outer side surface side and the second holding surface 262 intersecting the axial direction on the second outer side surface side, as the surface intersecting the axial direction; and the first adhesive 4a having elasticity is disposed between the first outer side surface and the first holding surface 261 intersecting the axial direction on the first outer side surface side, and the second adhesive 4b having elasticity is disposed between the second outer side surface and the second holding surface 262 intersecting the axial direction on the second outer side surface side.

With such a configuration, it is possible to further suppress the generation of abnormal noise in the above description (14) or (15).

(17) The rotating device 1 according to the above description (16), wherein the motor 3 includes the first bearing part 341 and the second bearing part 351; the first bearing part 341 includes the bearing 341a and the end part of the frame 30 as the first end part 34; the second bearing part 351 includes the bearing 351a and the second end part 35 of the frame 30; the first end part 34 and the second end part 35 include the outer side surfaces 342a and 352a intersecting the axial direction, respectively; in the housing 2, the first holding wall 26 for holding the first bearing part 341 and the second holding wall 27 for holding the second bearing part 351 are provided; the first adhesive 4a having elasticity is disposed between the first holding surface 261 intersecting the axial direction in the first holding wall 26 and the third outer side surface 342a of the first end part 34; and the second adhesive 4b having elasticity is disposed between the second holding surface 262 intersecting the axial direction in the second holding wall 27 and the second bearing part 351 of the second end part 35.

With such a configuration, the rotating device 1 can be suitably used for the motor 3 of the type of the rotating shaft 31 of which protrudes in one direction of the frame 30, and it is possible to suppress the generation of abnormal noise while suppressing the increase in cost.

(18) The rotating device 1 according to the above description (16), wherein in the housing (2), the motor holding part 101 holding the tubular-shaped body 32 of the frame 30 is provided, and the adhesive 4 having elasticity is disposed between the tubular-shaped body 32 and the motor holding part 101 holding the tubular-shaped body 32 of the frame 30.

With such a configuration, the rotating device 1 can be suitably used for the motor 3 of the type of the rotating shaft 31 of which protrudes in both directions of the frame 30, and it is possible to suppress the generation of abnormal noise while suppressing the increase in cost.

(19) The rotating device 1 according to any one of the above descriptions (16) to (18), wherein the gap d in which the adhesive 4 having elasticity is disposed is provided between the outer peripheral side surface of the tubular-shaped body 32 and the wall part 2a to be the holding surface of the motor holding part 101 facing the outer peripheral side surface of the tubular-shaped body 32.

With such a configuration, it is possible to dispose the adhesive 4 having elasticity between the motor 3 and the wall part 2a to be the holding surface more securely.

(20) The rotating device 1 according to the above description (16), wherein the rotating shaft 31 protrudes from each of the first end part 34 and the second end part 35; in the housing 2, the first bearing 355 and the second bearing 356 holding both end parts of the rotating shaft 31, and the motor holding part 101 holding the tubular-shaped body 32 of the frame 30 are provided; and the third adhesive 4c having elasticity is disposed between the tubular-shaped body 32 of the frame 30 and the motor holding part 101.

With such a configuration, with respect to the motor 3 of the type of the rotating shaft 31 of which protrudes in both directions of the frame 30, it is possible to exhibit the effect of the above description (16), that is, to sufficiently suppress the generation of abnormal noise.

(21) The rotating device 1 according to the above description (16), wherein the rotating shaft 31 protrudes from each of the first end part 34 and the second end part 35; in the housing 2, the first bearing 355 and the second bearing 356 holding both end parts of the rotating shaft 31, and one motor holding part 101a and the other motor holding part 101a holding the tubular-shaped body 32 of the frame 30 are provided; and the third adhesive 4c having elasticity is disposed between the first outer side surface of the frame 30 and the one motor holding part 101a, and between the second outer side surface and the other motor holding part 101a.

With such a configuration also, with respect to the motor 3 of the type of the rotating shaft 31 of which protrudes in both directions of the frame 30, it is possible to exhibit the effect of the above description (16), that is, to sufficiently suppress the generation of abnormal noise.

(22) The rotating device 1 according to any one of the above descriptions (13) to (21), wherein the adhesive 4 having elasticity is at least one of a rubber-based resin member, a silicone-based resin member, a modified silicone-based resin member, a urethane-based resin member, or an epoxy-based resin member.

With such a configuration, it is possible to suppress the generation of abnormal noise, while easily suppressing the increase in cost without using a special material.

While the present invention has been described above based on the embodiments, the present invention is not limited to the embodiments, and can naturally be variously changed within the scope not deviating from the gist of the present invention. Such various changes within the scope not deviating from the gist are also included in the technical scope of the present invention, and apparent to those skilled in the art from the description of the claims.

REFERENCE SIGNS LIST 1 rotating device
2 housing
2a wall part
3 motor
3a function unit
4 adhesive having elasticity
4a first adhesive having elasticity
4b second adhesive having elasticity
5 output gear
6 gear group
7 sensor
21 first housing
22 second housing
23 annular groove part
26 first holding wall
26a first recessed part
26b second recessed part
27 second holding wall
27a inclined surface
28 protrusion part
28a base
29 thick part
30 frame
31 rotating shaft
31a first protrusion axis
31b second protrusion axis
32 tubular-shaped body
34 first end part
35 second end part
40 terminal group
51 output shaft
60 fastening tool
61 first transmission gear
61a helical gear
61b small diameter gear
62 second transmission gear
70 worm gear
91 projection part
92 fitting hole
93 joining piece
94 connection hole
101 motor holding part
200 sheet metal
201 fastening hole
202 plate body
203 hole part
210 first surface part
211 first side wall part
212 engagement part
214 opening part
215 engagement recessed part
220 second surface part
222 second side wall part 224 engagement projection
226 opening part
228 motor arrangement part
261 first holding surface
262 second holding surface
271 first contact surface
272 second contact surface
281 first through hole
281a female screw part
282 second through hole
283 tip end
284 end
301, 302 gap
341 first bearing part
342 first side part
342a third outer side surface
351 second bearing part
352 second side part
352a fourth outer side surface
353 outer surface
356 second bearing
d gap
D aperture

The invention claimed is:

1. A rotating device, comprising:
a housing including a first housing and a second housing opposing each other;
a motor accommodated in the housing; and
a gear configured to transmit rotation of the motor to an external device, a direction of an axis of the gear being a direction from the first housing toward the second housing, wherein
the first housing and the second housing are molded of resin,
the first housing includes a first surface part and a first side wall part provided at an outer circumferential part of the first surface part,
tubular protrusion parts are molded at corners of the first side wall part,
the tubular protrusion parts include first through holes, and
the second housing includes a second surface part and a second side wall part provided at an outer circumferential part of the second surface part,
second through holes having the second through hole are formed at corners of the second side wall part, and
the tubular protrusion parts fit into the second through holes.

2. The rotating device according to claim 1, wherein outer diameters of the tubular protrusion parts are larger than diameters of the second through holes.

3. The rotating device according to claim 1, wherein
the tubular protrusion parts are provided at a plurality of respective corners of the first side wall part, and
the second through holes are provided at a plurality of respective corners of the second side wall part.

4. The rotating device according to claim 1, wherein
the first housing and the second housing include a first contact surface and a second contact surface coming into contact with each other, respectively,
the first housing includes a first surface part opposing the second housing, and the tubular protrusion parts protrude from the first contact surface, and
the second housing includes a second surface part opposing the first housing, and the second through hole extends from the second contact surface to the second surface part.

5. The rotating device according to claim 4, wherein at the first contact surface, annular groove parts are formed, the annular groove parts surrounding the tubular protrusion parts.

6. The rotating device according to claim 1, wherein a protrusion length L1 of the tubular protrusion part and a thickness H of the housing in a region satisfy a relation of $0.3*H \leq L1 \leq 0.8*H$, the tubular protrusion part being provided at the region.

7. The rotating device according to claim 1, wherein a protrusion length L1 of the tubular protrusion part and a total length L2 of the second through hole satisfy a relation of $L1 \leq L2$.

8. The rotating device according to claim 1, wherein a protrusion length L1 of the tubular protrusion part and a total length L2 of the second through hole satisfy a relation of $0.3 \leq L1/L2 \leq 1.0$.

9. The rotating device according to claim 1, wherein the housing is capable of being mounted on a predetermined mounting surface via a fastening tool to be inserted into the first through hole.

10. The rotating device according to claim 1, wherein
the first surface part includes a projection part,
the second surface part includes a hole part fitting the projection part.

11. The rotating device according to claim 10, wherein
the first housing includes a plurality of projecting parts having the projection part,
the second housing includes hole parts having the hole part.

12. The rotating device according to claim 11, wherein
the first housing and the second housing include a first contact surface and a second contact surface coming into contact with each other, respectively,
at the first contact surface, annular groove parts are formed, the annular groove parts surrounding the tubular protrusion parts.

13. The rotating device according to claim 1, wherein
the tubular protrusion parts are molded with parts of the first side wall part,
the second through holes are formed with parts of the second side wall part.

14. The rotating device according to claim 1, wherein
the tubular protrusion parts are press-fitted into the second through holes.

* * * * *